US010433179B2

(12) United States Patent
Zhang et al.

(10) Patent No.: US 10,433,179 B2
(45) Date of Patent: Oct. 1, 2019

(54) SPATIAL-DIVISION MULTIPLE ACCESS (SDMA) ACROSS MULTIPLE OPERATORS

(71) Applicant: QUALCOMM Incorporated, San Diego, CA (US)

(72) Inventors: Xiaoxia Zhang, San Diego, CA (US); Taesang Yoo, San Diego, CA (US); Siddhartha Mallik, San Diego, CA (US); Tamer Kadous, San Diego, CA (US); Vikas Jain, San Diego, CA (US); Ahmed Sadek, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 37 days.

(21) Appl. No.: 15/787,141

(22) Filed: Oct. 18, 2017

(65) Prior Publication Data
US 2018/0302796 A1 Oct. 18, 2018

Related U.S. Application Data

(60) Provisional application No. 62/484,730, filed on Apr. 12, 2017.

(51) Int. Cl.
| H04W 16/14 | (2009.01) |
| H04W 16/10 | (2009.01) |
| H04B 7/06 | (2006.01) |
| H04L 5/00 | (2006.01) |
| H04B 7/0413 | (2017.01) |
| H04L 29/08 | (2006.01) |
| H04B 7/204 | (2006.01) |
| H04W 74/08 | (2009.01) |

(52) U.S. Cl.
CPC .......... *H04W 16/14* (2013.01); *H04B 7/0413* (2013.01); *H04B 7/0697* (2013.01);
(Continued)

(58) Field of Classification Search
CPC . H04W 16/14; H04W 16/10; H04W 74/0875; H04B 7/0413; H04B 7/0697;
(Continued)

(56) References Cited

U.S. PATENT DOCUMENTS 7,130,638 B2* 10/2006 Chen ................. H04W 72/10
455/452.2
7,969,949 B2* 6/2011 Liu ................... H04W 72/0486
370/315

(Continued)

OTHER PUBLICATIONS

International Search Report and Written Opinion—PCT/US2018/022153—ISA/EPO—dated Jun. 21, 2018.

(Continued)

*Primary Examiner* — Curtis A Alia
(74) *Attorney, Agent, or Firm* — Haynes and Boone, LLP

(57) ABSTRACT

Wireless communications systems and methods related to SDMA operations across multiple network operating entities are provided. A first wireless communication device transmits a communication indicating a reservation for one or more spatial layers in a transmission opportunity (TXOP) of a shared spectrum. The shared spectrum is shared by a first network operating entity and a second network operating entity. The first wireless communication device is associated with the first network operating entity. The first wireless communication device communicates, with a second wireless communication device, data over the one or more spatial layers during the TXOP. The second wireless communication device is associated with the first network operating entity.

57 Claims, 11 Drawing Sheets

(52) U.S. Cl.
CPC ........... *H04L 5/0098* (2013.01); *H04W 16/10* (2013.01); *H04B 7/204* (2013.01); *H04L 5/001* (2013.01); *H04L 5/0048* (2013.01); *H04L 67/2833* (2013.01); *H04W 74/0875* (2013.01)

(58) Field of Classification Search
CPC ....... H04B 7/204; H04L 5/0098; H04L 5/001; H04L 5/0048; H04L 67/2833
See application file for complete search history.

(56) References Cited

U.S. PATENT DOCUMENTS

| | | | |
|---|---|---|---|
| 8,761,195 B2* | 6/2014 | Tiirola | H04L 27/2613 370/450 |
| 8,989,062 B2* | 3/2015 | Rahman | H04B 7/0417 370/252 |
| 2006/0040675 A1* | 2/2006 | Halfmann | H04W 16/28 455/456.1 |
| 2016/0094318 A1* | 3/2016 | Shattil | H04B 7/026 375/267 |
| 2016/0212625 A1 | 7/2016 | Damnjanovic et al. | |

OTHER PUBLICATIONS

Tiiro S., et al., "Cooperative Source Number Estimation for Cognitive Radio Networks", The International Conference on Information Networking 2014 (ICOIN2014), IEEE, Feb. 10, 2014, XP032586956, DOI: 10.1109/ICOIN.2014.6799713 [retrieved on Apr. 16, 2014], pp. 401-405.

* cited by examiner

SPATIAL-DIVISION MULTIPLE ACCESS (SDMA) ACROSS MULTIPLE OPERATORS

CROSS REFERENCE TO RELATED APPLICATIONS

The present application claims priority to and the benefit of the U.S. Provisional Patent Application No. 62/484,730, filed Apr. 12, 2017, which is hereby incorporated by reference in its entirety as if fully set forth below and for all applicable purposes.

TECHNICAL FIELD

This application relates to wireless communication systems, and more particularly to improving spectrum sharing among multiple network operating entities by employing spatial-division multiple access (SDMA).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations (BSs), each simultaneously supporting communication for multiple communication devices, which may be otherwise known as user equipment (UE).

A wireless communications system may operate over a shared spectrum, meaning that the wireless communications system includes one or more frequency bands that may be shared by multiple network operating entities. The shared spectrum may include unlicensed spectrum and/or licensed spectrum. In some instances, multiple network operating entities may share their licensed spectrum with each other to better utilize the spectrum. In some other instances, multiple network operating entities may obtain a licensed spectrum together.

One approach to sharing a medium or a spectrum is to employ a priority-based coordinated access scheme. In the priority-based coordinated access scheme, a shared spectrum is partitioned into multiple time periods. Each time period is designated for a particular type of access. For example, a time period can be allocated to a particular network operator for exclusive access of the shared spectrum, where no reservation from the particular network operator is required. Alternatively, a time period can be shared among multiple network operators on a priority basis with reservations. For example, a high-priority network operator may have priority or guaranteed access of the shared spectrum in a time period, but requires a prior reservation of the time period. When the high-priority network operator does not reserve the time period, a low-priority network operator can opportunistically access the shared spectrum in the time period. While the priority-based coordinated access scheme may be relatively efficient, the priority-based coordinated access scheme only considers medium sharing over time and/or frequency.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes transmitting, by a first wireless communication device associated with a first network operating entity, a communication indicating a reservation for one or more spatial layers in a transmission opportunity (TXOP) of a shared spectrum, wherein the shared spectrum is shared by the first network operating entity and a second network operating entity; and communicating, by the first wireless communication device with a second wireless communication device associated with the first network operating entity, data over the one or more spatial layers during the TXOP.

In an additional aspect of the disclosure, an apparatus includes a transceiver configured to transmit a communication indicating a reservation for one or more spatial layers in a transmission opportunity (TXOP) of a shared spectrum, wherein the shared spectrum is shared by a first network operating entity and a second network operating entity, and wherein the apparatus is associated with the first network operating entity; and communicate, with a second wireless communication device associated with the first network operating entity, data over the one or more spatial layers during the TXOP.

In an additional aspect of the disclosure, a computer-readable medium having program code recorded thereon, the program code includes code for causing a first wireless communication device associated with a first network operating entity to transmit a communication indicating a reservation for one or more spatial layers in a transmission opportunity (TXOP) of a shared spectrum, wherein the shared spectrum is shared by the first network operating entity and a second network operating entity; and code for causing the first wireless communication device to communicate, with a second wireless communication device associated with the first network operating entity, data over the one or more spatial layers during the TXOP.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
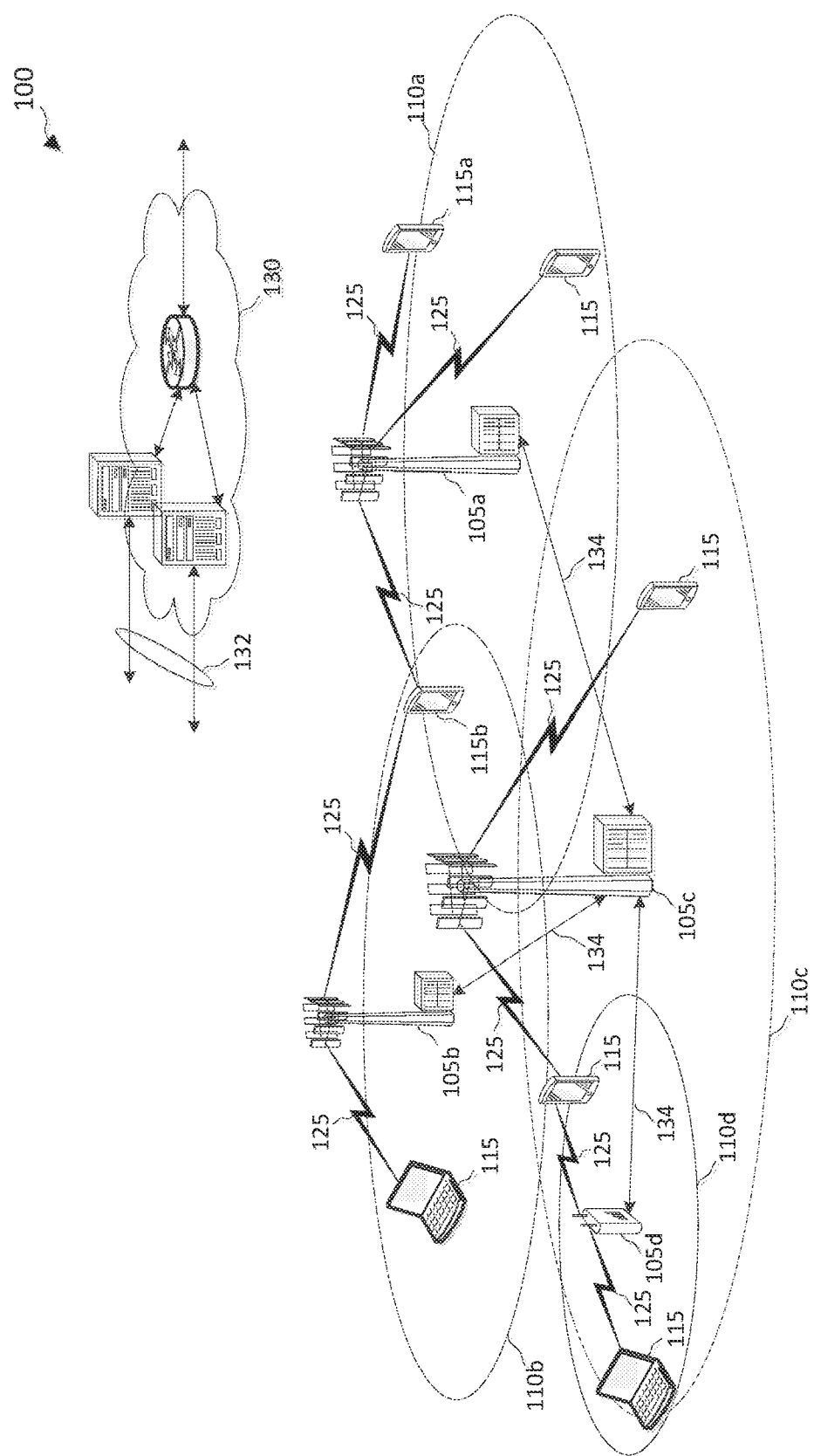
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G) operating in mmWave bands) network.

The present disclosure describes mechanisms for sharing transmission spatial layers across multiple network operating entities in addition to time and frequency. In a priority-based spectrum sharing scheme, a spectrum is time-partitioned into transmission opportunities (TXOPs). Each TXOP is designated for prioritized use by a prioritized or high-priority network operating entity and opportunistic use by low-priority network operating entities based on reservations. In the disclosed embodiments, network operating entities sharing a medium or a spectrum may exchange spatial layer information, for example, via a central authority. The spatial layer information may indicate a total number of spatial layers supported by a network operating entity. In the disclosed embodiments, a high-priority network operating entity may reserve one or more of the supportable spatial layers for communications in a TXOP. A low-priority network operating entity may opportunistically use remaining unreserved spatial layers for communications in the TXOP. The sharing of spatial layers across multiple network operating entities is referred to as SDMA. The disclosed embodiments include frame structures, signaling mechanisms for low-priority network operating entities to detect spatial layer reservations from higher priority network operating entities. The disclosed embodiments include channel sounding mechanisms for all network operating entities sharing spatial layers in a TXOP to determine spatial channel information for SDMA pre-coding.

In one embodiment, medium reservations can be signaled via reservation response (RRS) signal transmissions by scheduled UEs and spatial channel sounding can be obtained from sounding reference signal (SRS) transmissions by the scheduled UEs. For example, each scheduled UE transmits an RRS signal to indicate each scheduled spatial layer and transmits an SRS according to each scheduled spatial layer to facilitate spatial channel estimation at base stations (BSs) of all network operating entities sharing the TXOP.

In one embodiment, medium reservations and spatial channel sounding can be obtained from SRS transmissions by scheduled UEs. For example, each scheduled UE transmits an SRS according to each scheduled spatial layer to indicate each scheduled spatial layer and to facilitate spatial channel estimation at BSs of all network operating entities sharing the TXOP.

In one embodiment, medium reservations can be signaled via explicit spatial layer scheduling information indications and other network operating entities sharing the spectrum can decode the explicit scheduling information. For example, the explicit scheduling information can be signaled via RRQ signal transmissions by granting BSs or simultaneously transmitted by all granting BSs in a single frequency network (SFN) manner Alternatively, the explicit scheduling information can be signaled via simultaneous RRS signal transmissions by all granting BSs and all scheduled UEs in the TXOP in an SFN manner In addition, the explicit scheduling information can include spatial layer reservation information at a finer granularity, for example, at a sub-period level within a TXOP.

Aspects of the present disclosure can provide several benefits. For example, the sharing of a medium in a spatial dimension in addition to time and frequency dimensions allow for sharing at a finer granularity, and thus may improve medium sharing efficiency. The synchronous operations of sharing based on structured TXOPs, as described in greater detail herein, allow for synchronous SDMA without massive antennas at BSs and/or UEs, and thus may provision for SDMA at a lower cost.

FIG. 1 illustrates a wireless communication network 100 according to embodiments of the present disclosure. The network 100 includes BSs 105, UEs 115, and a core network 130. In some embodiments, the network 100 operates over a shared spectrum. The shared spectrum may be unlicensed or partially licensed to one or more network operators. Access to the spectrum may be limited and may be controlled by a separate coordination entity. In some embodiments, the network 100 may be a LTE or LTE-A network. In yet other embodiments, the network 100 may be a millimeter wave (mmW) network, a new radio (NR) network, a 5G network, or any other successor network to LTE. The network 100 may be operated by more than one network operator. Wireless resources may be partitioned and arbitrated among the different network operators for coordinated communication between the network operators over the network 100.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with the core network 130 and with one another. The core network 130 may provide user authentication, access authorization, tracking, Internet Protocol (IP) connectivity, and other access, routing, or mobility functions. At least some of the BSs 105 (e.g., which may be an example of an evolved NodeB (eNB), a next generation NodeB (gNB), or an access node controller (ANC)) may interface with the core network 130 through backhaul links 132 (e.g., S1, S2, etc.) and may perform radio configuration and scheduling for communication with the UEs 115. In various examples, the BSs 105 may communicate, either directly or indirectly (e.g., through core network 130), with each other over backhaul links 134 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

In an embodiment, the BSs 105 can assign or schedule transmission resources (e.g., in the form of time-frequency resource blocks) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell-specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication tha UL communication. A UL-centric subframe may include a longer duration for UL communication tha UL communication.

In an embodiment, a UE 115 attempting to access the network 100 may perform an initial cell search by detecting a primary synchronization signal (PSS) from a BS 105. The PSS may enable synchronization of period timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105. After establishing the connection, the UE 115 and the BS 105 can enter a normal operation stage, where operational data may be exchanged.

In some embodiments, the UEs 115 and the BSs 105 may be operated by multiple network operators or network operating entities and may operate in a shared radio frequency spectrum, which may include licensed or unlicensed frequency bands. The shared spectrum may be time-partitioned for sharing among the multiple network operating entities to facilitate coordinated communication. For example, in the network 100, the BS 105a and the UE 115a may be associated with one network operating entity, while the BS 105b and the UE 115b may be associated with another network operating entity. By time-partitioning the shared spectrum according to network operating entities, the communications between the BS 105a and the UE 115a and the communications between the BS 105b and the UE 115b may each occur during respective time periods and may avail themselves of an entirety of a designated shared spectrum.

To support coordinated access of the shared spectrum, a BS 105 or an entity of the core network 130 may act as a central arbitrator to manage access and coordinate the partitioning of resources among different network operating entities operating within the network 100. In some embodiments, the central arbitrator may include a spectrum access system (SAS). In addition, the transmissions from the multiple network operating entities can be time synchronized to facilitate the coordination.

Figure 2:
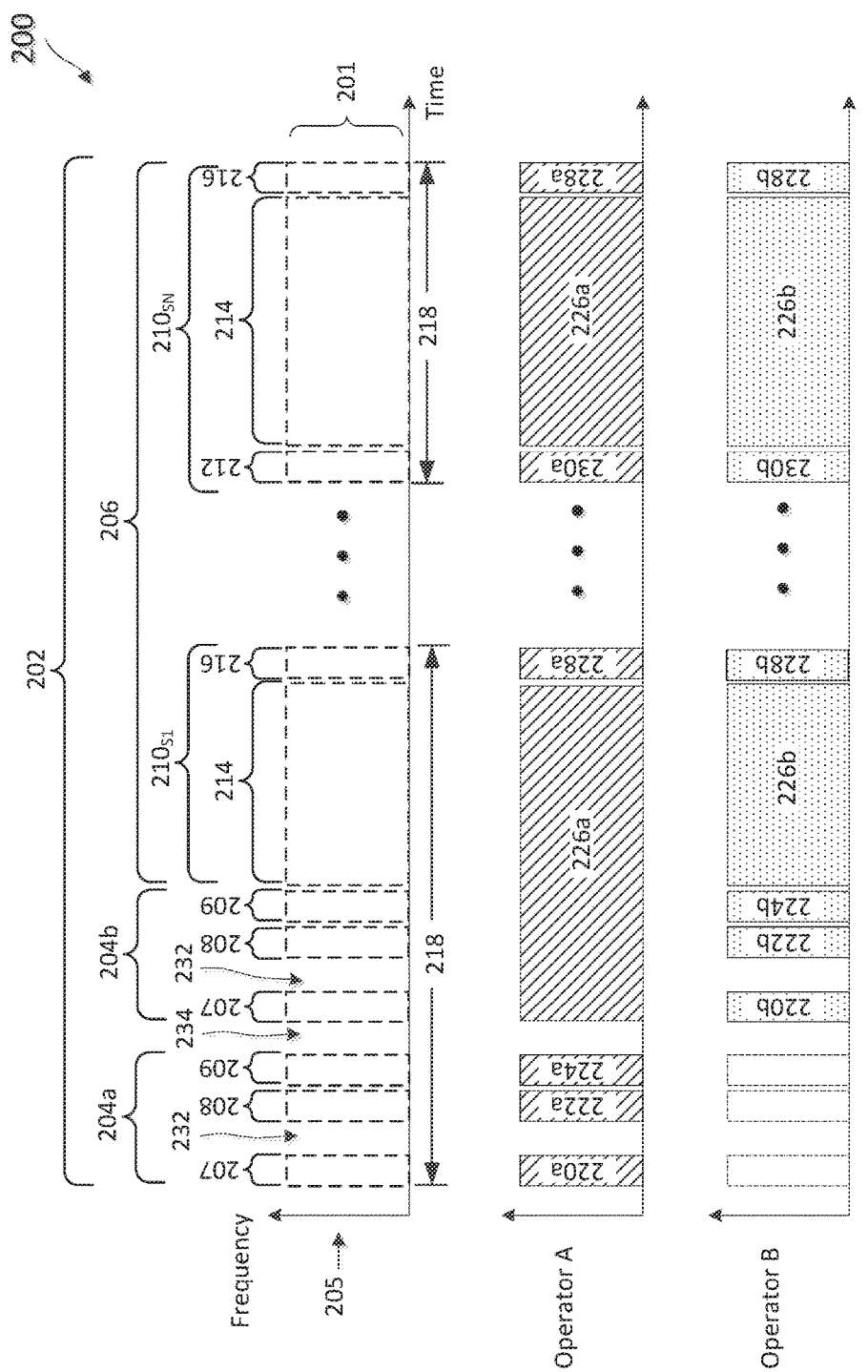
FIG. 2 illustrates a coordinated priority-based medium sharing scheme with interference management according to embodiments of the present disclosure.

FIG. 2 illustrates a coordinated priority-based spectrum sharing scheme 200 with interference management according to embodiments of the present disclosure. The x-axes represent time in some constant units. The y-axes represent frequency in some constant units. The scheme 200 may be employed by the BSs 105 and the UEs 115 to access a shared spectrum 201. While the scheme 200 illustrates coordinated spectrum access for two different network operating entities (e.g., Operator A and Operator B), the scheme 200 can be applied to any suitable number of network operating entities, including three, four, or more operating entities.

In the scheme 200, the spectrum 201 is time-partitioned into a plurality of transmit opportunities (TXOPs) 202 as shown in the frame structure 205. The TXOPs 202 may have a fixed duration and may be defined in units of OFDM symbols, subframes, slots, and/or any suitable time format. Each TXOP 202 includes a plurality of channel sensing or clear channel assessment (CCA) periods 204 followed by a transmission period 206. The CCA periods 204 are separated by a gap period 234. The frame structure 205 of the TXOP 202 is predetermined and known by all network operating entities sharing the spectrum 201. The network operating entities may be time-synchronized when operating in the shared spectrum 201.

Each CCA period 204 is assigned to a particular network operating entity (e.g., Operator A or Operator B). The assigned network operating entity may transmit a reservation in the CCA period 204 to reserve the following transmission period 206. Each CCA period 204 includes portions 207, 208, and 209. The portions 207 and 208 are separated by a gap period 232. The portions 207 are used for transmitting RRQ signals 220. Each RRQ signal 220 may include a predetermined preamble sequence, a request-to-send (RTS) signal, and/or transmission triggers (e.g., scheduling information). The portions 208 are used for transmitting RRS signals 222 for operator-level sharing (e.g., across operators). The portions 209 are used for transmitting RRS signals 224 for link-level sharing (e.g., between UL and DL) within an operator. Each of the RRS signals 222 and 224 may include a predetermined preamble sequence or a clear-to-send (CTS) signal. The CCA periods 204 can be arranged in a decreasing order of priorities. Thus, a low-priority operator node can monitor the channel (e.g., the shared spectrum 201) in the CCA periods 204 of higher priorities. Upon detection of a reservation from a high-priority operator node, the low-priority operator node may refrain from transmitting in the following transmission period 206. The gap period 234 allows low-priority operator nodes to process the reservation of a higher priority operator. The gap period 232 allows for switching between UL and DL processing.

The transmission period 206 includes a plurality of sub-periods 210 shown as $210_{S1}$ to $210_{SN}$. The first sub-period $210_{S1}$ includes portions 214 and 216. The remaining subperiods 210 in the transmission period 206 include portions 212, 214, and 216. The portions 212 are used for transmitting DL controls 230 (e.g., UL or DL triggers) for corresponding portions 214. The portions 214 are used for transmitting UL or DL data 226 based on corresponding triggers. The portions 216 are used for transmitting UL controls 228, such as scheduling request (SR) and hybrid automatic repeat request (HARQ) information. In an embodiment, the TXOP 202 is divided into a number of slots 218. The first slot 218 includes the CCA periods 204 and the sub-period $210_{S1}$. The remaining slots 218 correspond to the remaining sub-periods 210. In some embodiments, a slot 218 may span about 500 microseconds.

As an example, Operator A has priority over Operator B in the particular TXOP 202. As such, the high-priority CCA period 204a is assigned to Operator A and the low-priority CCA period 204b is assigned to Operator B. Thus, Operator A nodes have prioritized access in the transmission period 206, while Operator B nodes may opportunistically access the transmission period 206 when the transmission period 206 is not reserved by Operator A nodes. In addition, the default link direction is DL within Operator A and within Operator B during the TXOP 202. Thus, the transmission priorities in order are Operator A DL, Operator A UL, Operator B DL, and Operator B UL. The pattern-filled boxes shown with respect to Operators A and B in FIG. 2 represent signal transmissions. The dashed-outline boxes at the top of FIG. 2 are included as references to the TXOP structure 205 without signal transmission.

For prioritized access, a DL-granting BS of Operator A may transmit an RRQ signal 220a in the portion 207 of the CCA period 204a to reserve the following transmission period 206. The RRQ signal 220a may include a DL trigger. For dynamic TDD within Operator A, a UL-granting BS of Operator A may transmit an RRQ signal 220a including a UL trigger in the same portion 207 of the CCA period 204a based on reuse one. Operator A triggered nodes may transmit an RRS signal 222a in the portion 208 of the CCA period 204a to silence Operator B nodes (e.g., the low-priority operator). Operator B nodes may monitor the CCA period 204a for an RRQ signal 220a and/or an RRS signal 222a from Operator A. Upon detection of the RRQ signal 220a and/or the RRS signal 222a, Operator B nodes may yield spectrum access to Operator A.

A DL-triggered UE (e.g., the target receiver) may transmit an RRS signal 224a in the portion 209 of the CCA period 204a to silence Operator A nodes of a lower link priority (e.g., UL). Subsequently, the DL-granting BS may transmit data 226a to the DL-triggered UE in the portion 214 of the sub-period $210_{S1}$. The DL-triggered UE may transmit UL control 228a in the portion 216 of the sub-period $210_{S1}$. In subsequent sub-periods 210, the DL-granting BS may trigger one or more other UEs for DL communications. In some embodiments, the transmission period 206 may begin after the CCA period 204a (e.g., occupying the low-priority CCA period 204b).

The UL-triggered UE may monitor for an RRS signal 224a in the portion 209 of the CCA period 204a. When no RRS signal 224a is detected, the UL-triggered UE may dynamically switch the link priority to UL and transmit data 226a and a UL control 228a to the UL-granting BS during the portions 214 and 216, respectively, of the sub-period $210_{S1}$. When there are lower priority operator nodes, the UL-granting BS (e.g., the target receiver) may transmit an RRS signal 222a during the portion 209 of the CCA period 204a to silence low-priority nodes near the UL-granting BS. In subsequent sub-periods 210, the UL-granting BS may trigger one or more other UEs for UL communications. While the dynamic TDD mechanisms are described in the context of switching a link priority from DL to UL, similar mechanisms can be applied to a link priority from UL to DL.

When the shared spectrum 201 is not reserved by Operator A, Operator B can opportunistically access the TXOP 202 using similar mechanisms as Operator A. For example, a UL-granting BS and/or a DL-granting BSs of Operator B may transmit RRQ signals 220b in the portion 207 of the assigned CCA period 204b to trigger DL and/or UL communications of data 226b. Operator B triggered nodes can transmit an RRS signal 222b in the portion 208 of the CCA period 204b when there are lower priority operator. A DL-triggered UE can transmit an RRS signal 224b in the portion 209 of the CCA period 204b. Subsequently, the DL-granting BS can transmit data 226b to the DL-triggered UE in the portion 214 of the sub-period $210_{S1}$. The DL-triggered UE can transmit UL control 228b in the portion 216 of the sub-period $210_{S1}$. To switch the link priority from the default link priority, the UL-triggered UE may monitor for an RRS signal 224b in the portion 209. When no RRS signal 224b is detected, the UL-triggered UE may transmit data 226b and a UL control 228b to the UL-granting BS during the portions 214 and 216, respectively, of the sub-period $210_{S1}$.

Figure 3:
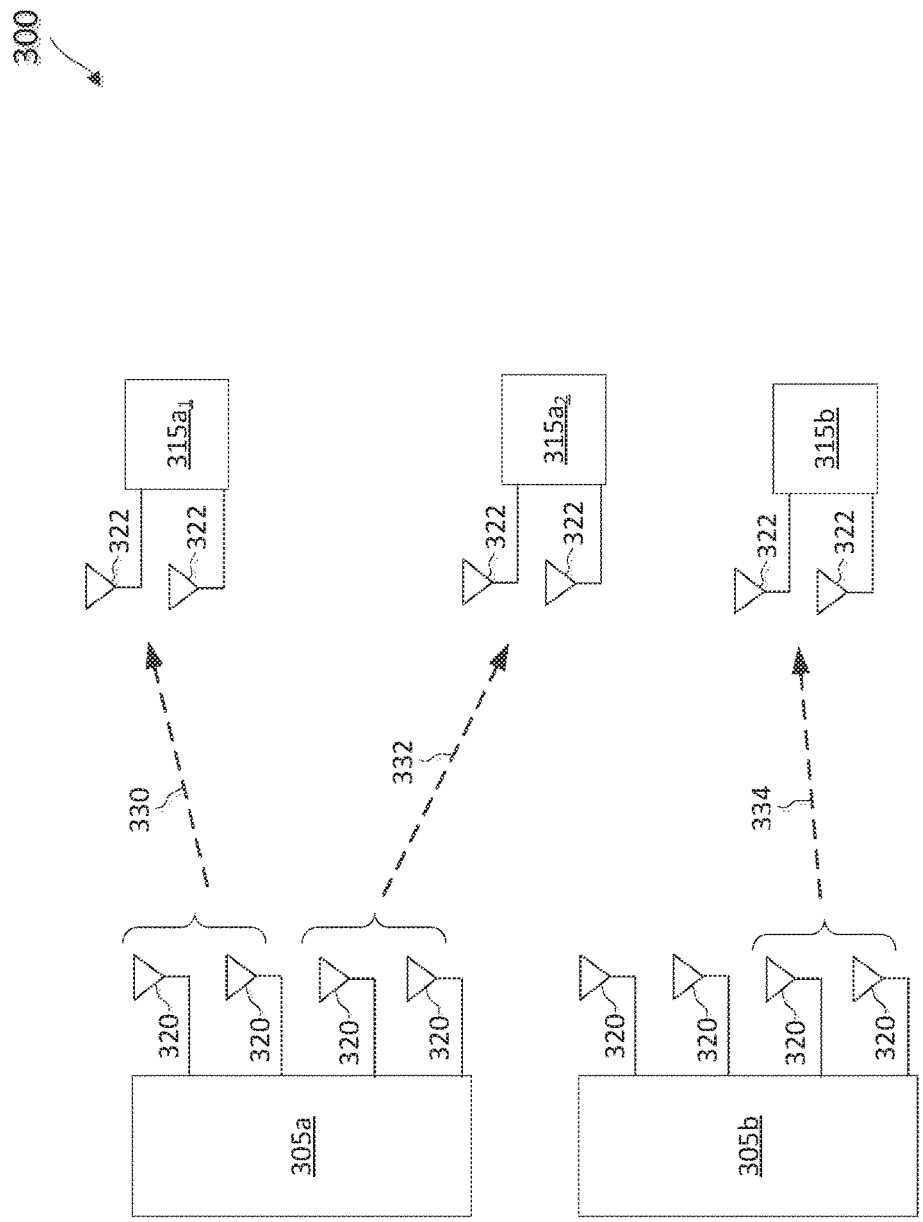
FIG. 3 illustrates a wireless communication network that implements spatial-division multiple access (SDMA) for medium sharing according to embodiments of the present disclosure.

FIG. 3 illustrates a wireless communication network 300 that implements SDMA for medium sharing according to embodiments of the present disclosure. The network 300 corresponds to a portion of the network 100. FIG. 3 illustrates two BSs 305 and three UEs 315 for purposes of simplicity of discussion, though it will be recognized that embodiments of the present disclosure may scale to many more UEs 315 and/or BSs 305. The BSs 305 and the UEs 315 may be similar to the BSs 105 and the UEs 115, respectively. The network 300 may be operated by multiple operators sharing a frequency spectrum. For example, Operator A may operate the BSs 305a and the UEs 315a, and Operator B may operate the BSs 305b and the UEs 315b. In addition, FIG. 3 illustrates each BS 305 including four transmit antennas 320 and each UE 315 including two receive antennas 322 for purposes of simplicity of discussion, though it will be recognized that embodiments of the present disclosure may scale to any suitable number of transmit antennas and/or receive antennas at the BSs 305 and/or the UEs 315.

The BS 305a having four transmit antennas 320 can support a transmission rank of four or four spatial layers. The BS 305a may employ single-input multiple-output (SIMO), multiple-input single-output (MISO), or multiple-input multiple-output (MIMO) type pre-coding techniques to communicate with the UEs 315 over a number of the spatial layers. For example, the BS 305a may communicate with the UE $315a_1$ using a subset or all of the transmit antennas 320 over two spatial layers as shown by the link 330. In addition, the BS 305a may communicate with the UE $315a_2$ using a subset or all of the transmit antennas 320 over another two spatial layers as shown by the link 332. The communications with the UE $315a_1$ and the UE $315a_2$ may occur simultaneously via the pre-coding. Similar to the BS 305a, the BS 305b can support a transmission rank of four or four spatial layers and may employ SIMO, MISO, or MIMO techniques to communicate with the UE 315b.

The BS 305a of Operator A and the BS 305b of Operator B may share a spectrum (e.g., the spectrum 201) for communication with corresponding UEs 315 using a similar medium sharing scheme as the scheme 200. However, in addition to sharing over time and frequency, Operator A and Operator B may share over a spatial dimension (e.g., the spatial layers). For example, when the BS 305a uses two of the four spatial layers for communication with the UE $315a_1$ in a TXOP (e.g., the TXOP 202), the BS 305b may use the remaining two spatial layers to communicate with the UE 315b during the same TXOP as shown by the link 334.

In an embodiment, Operator A may include N1 number of BSs in a coordinated multipoint (CoMP) cluster and each of the Operator A BSs may include M1 number of transmit antennas. Thus, Operator A can support N1 by M1 number of spatial layers in the CoMP cluster. Operator B may include N2 number of BSs in a CoMP cluster and each of the Operator B BSs may include M2 number of transmit antennas, supporting N2 by M2 spatial layers. To facilitate SDMA over a shared spectrum, operators may share information associated with the number of supportable spatial layers with each other, for example, via SAS or backhaul coordination. The mechanisms for employing SDMA-based medium sharing are described in greater detail herein.

Figure 4:
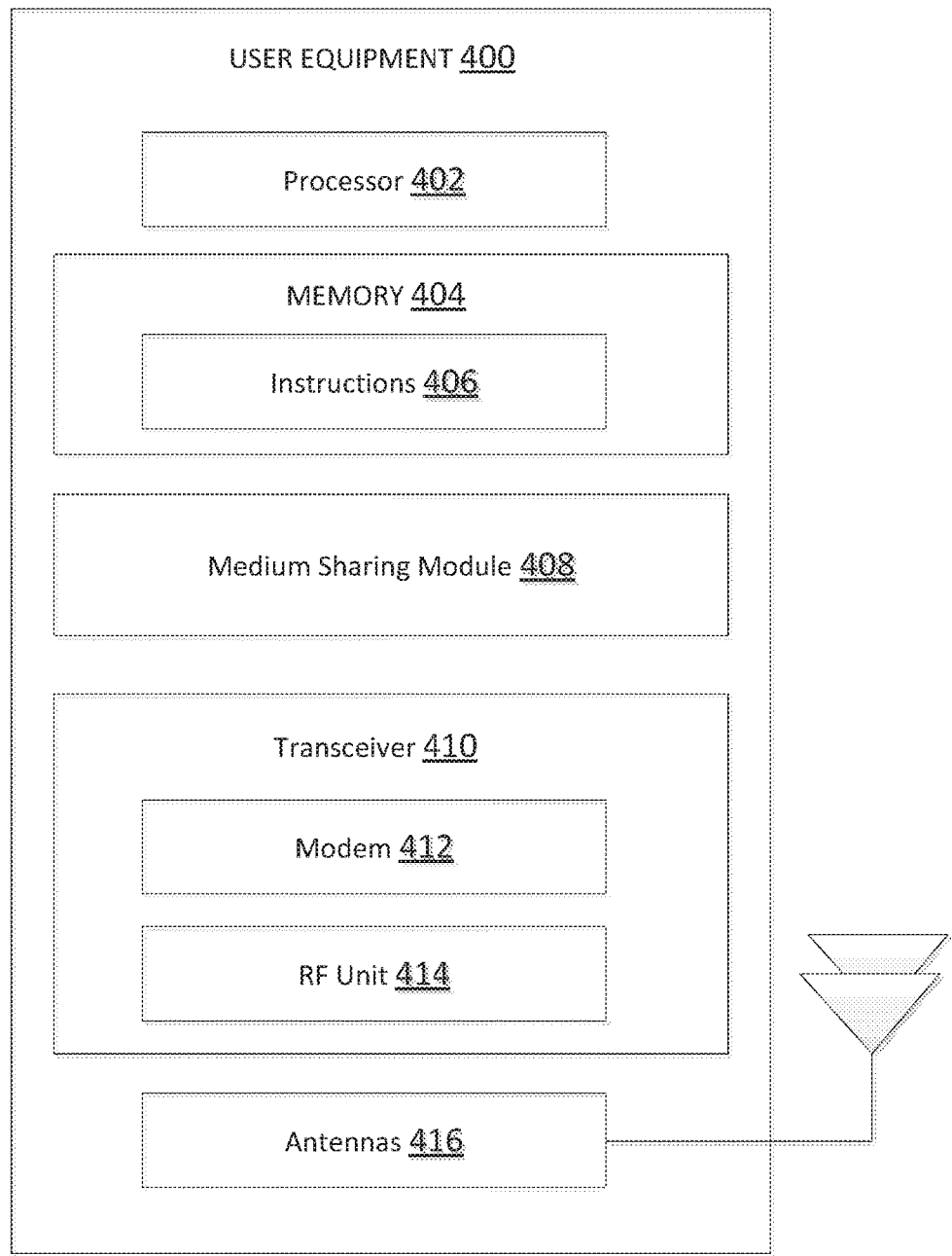
FIG. 4 is a block diagram of an exemplary user equipment (UE) according to embodiments of the present disclosure.

FIG. 4 is a block diagram of an exemplary UE 400 according to embodiments of the present disclosure. The UE 400 may be a UE 115 or 315 as discussed above. As shown, the UE 400 may include a processor 402, a memory 404, a medium sharing module 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store instructions 406. The instructions 406 may include instructions that, when executed by the processor 402, cause the processor 402 to perform the operations described herein with reference to the UEs 215 in connection with embodiments of the present disclosure. Instructions 406 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The medium sharing module 408 may be implemented via hardware, software, or combinations thereof. For example, the medium sharing module 408 may be implemented as a processor, circuit, and/or instructions 406 stored in the memory 404 and executed by the processor 402. The medium sharing module 408 may be used for various aspects of the present disclosure. For example, the medium sharing module 408 is configured to identify TXOPs in a shared spectrum, perform network listening, transmit RRSs and/or SRSs to indicate scheduled spatial layers, transmit SRSs to facilitate spatial channel estimation, and/or perform pre-coding based on spatial channel estimation, as described in greater detail herein.

As shown, the transceiver 410 may include the modem subsystem 412 and the RF unit 414. The transceiver 410 can be configured to communicate bi-directionally with other devices, such as the BSs 105 and 305. The modem subsystem 412 may be configured to modulate and/or encode the data from the memory 404 and/or the SDMA-based medium sharing module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 315 or a BS 305. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 215 to enable the UE 215 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may be similar to the antennas 320 and 322. This may include, for example, transmission of RRS signals and/or SRSs according to embodiments of the present disclosure. The antennas 416 may further receive data messages transmitted from other devices. This may include, for example, reception of request-to-send (RTS) and/or CTS signals according to embodiments of the present disclosure. The antennas 416 may provide the received data messages for processing and/or demodulation at the transceiver 410. The antennas 416 may include multiple antennas of similar or different designs in order to sustain multiple transmission links. The RF unit 414 may configure the antennas 416.

Figure 5:
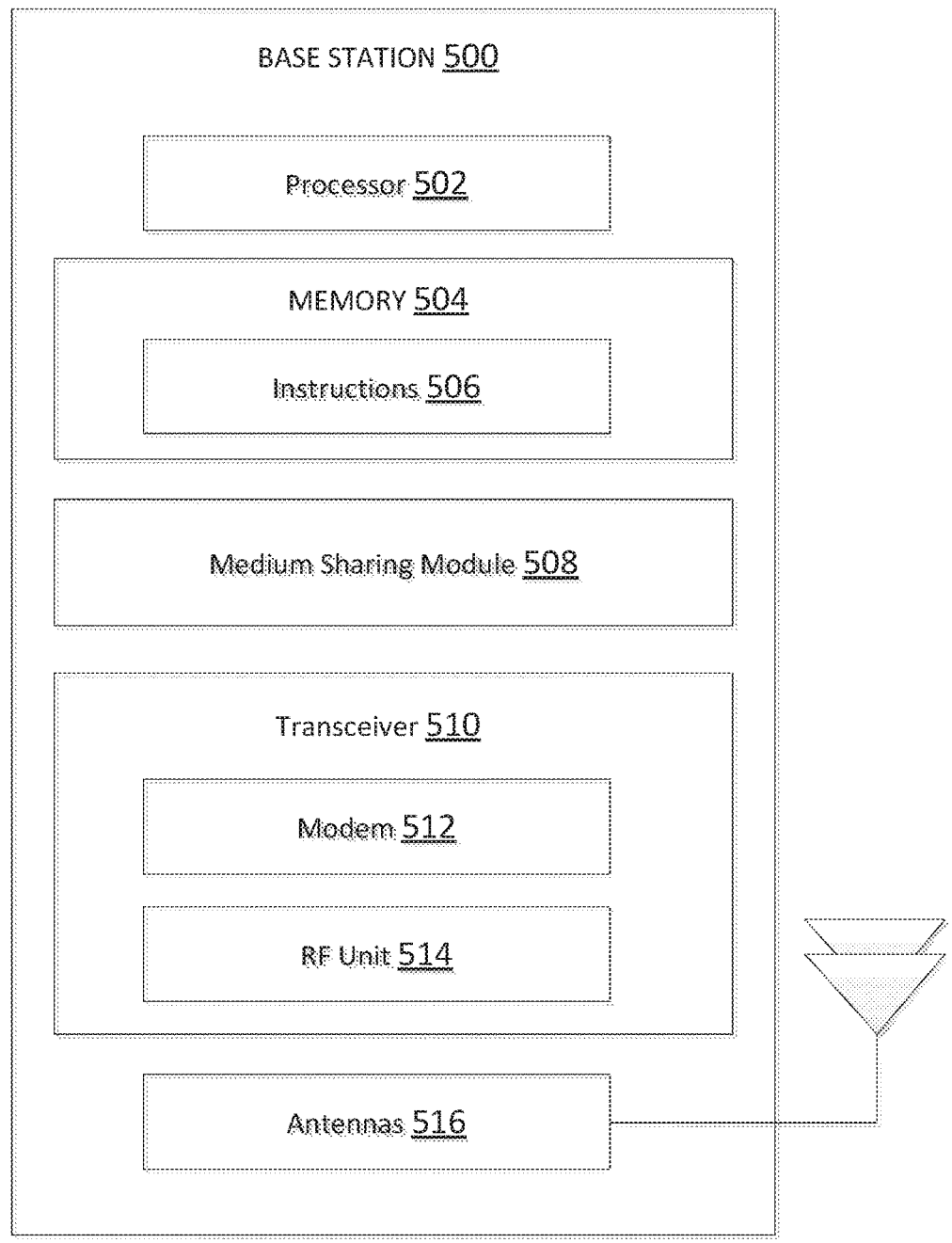
FIG. 5 is a block diagram of an exemplary base station (BS) according to embodiments of the present disclosure.

FIG. 5 is a block diagram of an exemplary BS 500 according to embodiments of the present disclosure. The BS 500 may be a BS 105 or 305 as discussed above. A shown, the BS 500 may include a processor 502, a memory 504, a medium sharing module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein. Instructions 506 may also be referred to as code, which may be interpreted broadly to include any type of computer-readable statement(s) as discussed above with respect to FIG. 5.

The medium sharing module 508 may be implemented via hardware, software, or combinations thereof. For example, the medium sharing module 508 may be implemented as a processor, circuit, and/or instructions 506 stored in the memory 404 and executed by the processor 502. The medium sharing module 508 may be used for various aspects of the present disclosure. For example, the medium sharing module 508 is configured to is configured to identify TXOPs in a shared spectrum, perform network listening, schedule UEs over spatial layers, trigger scheduled UEs for RRS and/or SRS transmissions, receive SRSs from scheduled UEs, detect SRSs of other operators, estimate spatial channel information based on received SRSs and detected SRSs, and/or perform pre-coding based on estimated spatial channel information for SDMA, as described in greater detail herein.

As shown, the transceiver 510 may include the modem subsystem 512 and the RF unit 514. The transceiver 510 can be configured to communicate bi-directionally with other devices, such as the UEs 115 and 215 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 215. The RF unit 514 may be further configured to perform analog beamforming in conjunction with the digital beamforming. Although shown as integrated together in transceiver 510, the modem subsystem 512 and the RF unit 514 may be separate devices that are coupled together at the BS 305 to enable the BS 305 to communicate with other devices.

The RF unit 514 may provide the modulated and/or processed data, e.g. data packets (or, more generally, data messages that may contain one or more data packets and other information), to the antennas 516 for transmission to one or more other devices. The antennas 516 may be similar to the antennas 320 and 322. This may include, for example, transmission of information to complete attachment to a network and communication with a camped UE 215 according to embodiments of the present disclosure. The antennas 516 may further receive data messages transmitted from other devices and provide the received data messages for processing and/or demodulation at the transceiver 510. The antennas 516 may include multiple antennas of similar or different designs in order to sustain multiple transmission links.

Figure 6:
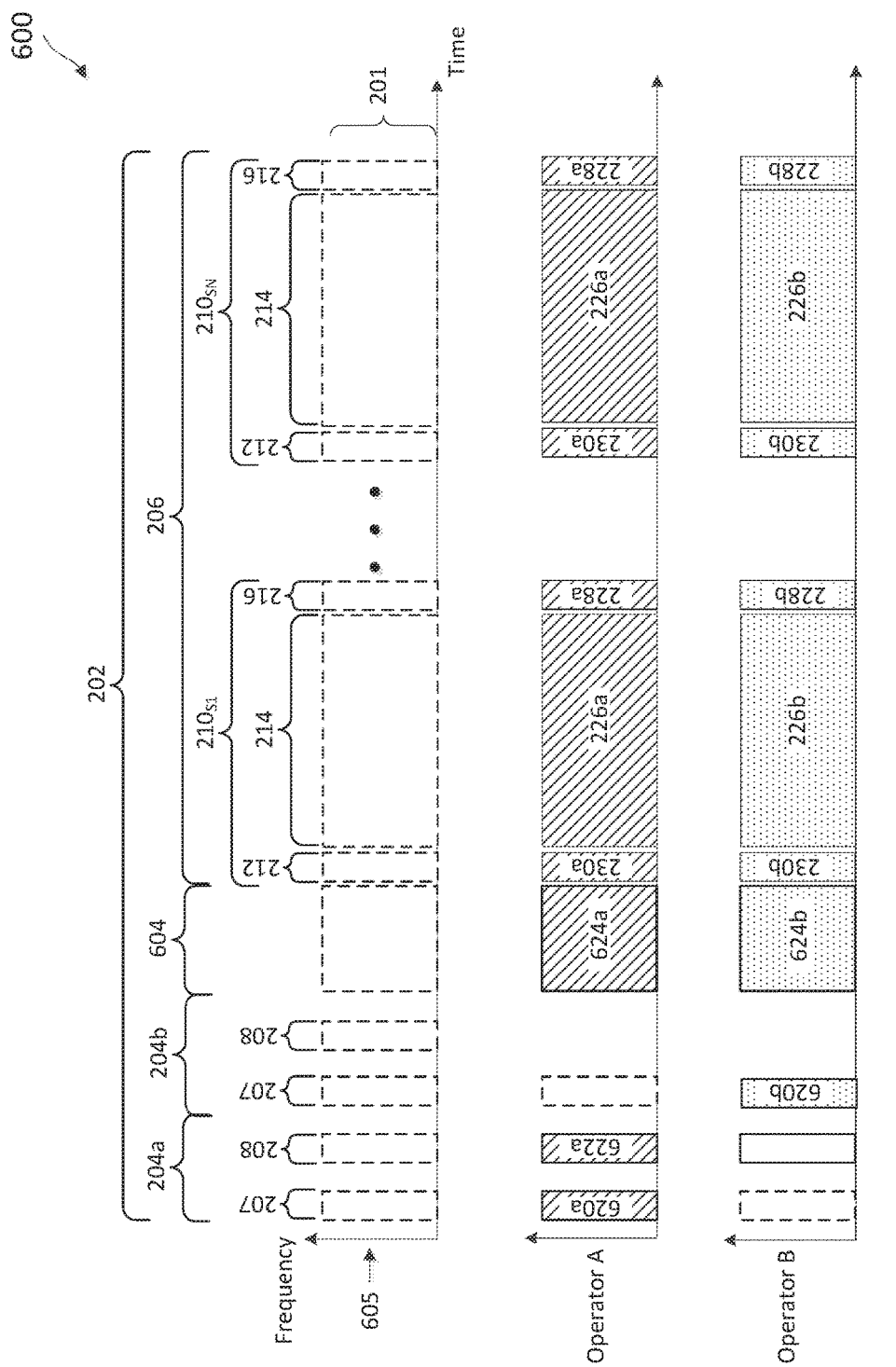
FIG. 6 illustrates an SDMA-based medium sharing scheme according to embodiments of the present disclosure.

FIG. 6 illustrates an SDMA-based medium sharing scheme 600 according to embodiments of the present disclosure. The x-axes represent time in some constant units. The y-axes represent frequency in some constant units. The scheme 600 may be employed by the BSs 105, 305, and 500 and the UEs 115, 315, and 400. The scheme 600 enables sharing of spatial layers across multiple operators in addition to time and frequency. For example, a high-priority operator may reserve one or more spatial layers for communication in a particular TXOP (e.g., the TXOP 202) and allow lower priority operators to share remaining unreserved spatial layers in the TXOP. Scheduled UEs of all operators sharing the spatial layers during a TXOP may transmit SRSs to facilitate SDMA pre-coding, as described in greater detail herein.

The scheme 600 time-partitions a spectrum 201 into TXOPs 202 and employs priority-based reservation mechanisms for sharing similar to the scheme 200. However, the scheme 600 includes additional signaling to facilitate SDMA. As shown in the frame structure 605, each TXOP 202 includes an SRS period 604 before the transmission period 206 in addition to the CCA periods 204. The SRS period 604 is designated for SRS transmissions by UEs scheduled in the transmission period 206. In addition, all sub-periods 210 within the transmission period 206 have a similar structure instead of having a different sub-period 210 at the beginning of the transmission period 206 as in the scheme 200. The sub-periods 210 may be referred to as transmission time intervals (TTIs) or slots. In an embodiment, each sub-period 210 may span a duration of about 500 microseconds.

As an example, Operator A has priority over Operator B in the particular TXOP 202. To facilitate sharing of spatial layers, Operators A and B may exchange spatial layer information. For example, BSs of Operator A may obtain spatial layer information of Operator B and BSs of Operator B may obtain spatial layer information of Operator A. The spatial layer information may include a total number of spatial layers supported by a corresponding operator.

A BS A of Operator A (e.g., the high-priority operator) may schedule a UE A of Operator A over one or more spatial layers in the TXOP 202. The BS A transmits an RRQ signal 620a in the portion 207 of the CCA period 204a to indicate a schedule, an RRS trigger, and an SRS trigger for the UE A. The RRS trigger may include RRS transmission resources in the portion 208 assigned to the UE A. The SRS trigger may include SRS transmission resources in the SRS period 604 assigned to the UE A. The RRS transmission resources and the SRS transmission resources may be UE-specific, spatial layer-specific resources. The RRQ signal 620a may also include a preamble and/or other information similar to the RRQ signal 220a.

Upon receiving the RRQ signal 620a, the UE A transmits an RRS signal 622a in the portion 208 of the CCA period 204a for each scheduled spatial layer according to the RRS trigger. For example, the RRS trigger may indicate an orthogonal resource in the portion 208 corresponding to each scheduled spatial layer. The orthogonal resource may be orthogonalized via frequency-division multiplex (FDM), time-division multiplex (TDM), and/or code-division multiplex (CDM). Thus, the UE A may transmit an RRS signal 622a for each scheduled spatial layer on a corresponding resource.

Subsequently, the UE A transmits an SRS 624a according to each scheduled spatial layer during the SRS period 604 according to the SRS trigger. For example, the SRS trigger may indicate an orthogonal resource in the SRS period 604 for each scheduled spatial layer. Thus, the UE A may transmit an SRS 624*a* according to each scheduled spatial layer on a corresponding resource.

A BS B of Operator B (e.g., the low-priority operator) monitors the CCA period 204*a* of the high-priority Operator A. Upon detection of the RRS signal 622*a* from Operator A, the BS B may determine a number of spatial layers and/or a number of UEs scheduled by Operator A in the TXOP 202 based on a number of received RRS signals 622*a*.

When the number of reserved spatial layers is less than the total number of supportable spatial layers of Operator A, the BS B may schedule a UE B over one or more of the remaining unreserved spatial layers in the TXOP 202. The BS B transmits an RRQ signal 620*b* similar to the RRQ signal 620*a*. In some embodiments, the RRQ signal 620*b* may not include an RRS trigger when Operator B has the lowest priority in the TXOP 202.

Upon receiving the RRQ signal 620*b*, the UE B transmits an SRS 624*b* according to each scheduled spatial layer during the SRS period 604 according to the SRS trigger. In an embodiment, the orthogonal resources in the SRS period 604 for the operators (e.g., Operator A and Operator B) may be pre-configured according to a predetermined rule. For example, the orthogonal resources are ordered based on spatial layers and operators to enable operators to decode SRSs from each other more efficiently.

The BS A may receive the SRSs 624*a* from the UE A based on SRS resources assigned by the BS A. The BS A may apply blind decoding to detect SRSs 624*b* from Operator B. Blind decoding refers to the detection of all allowable SRS signatures (e.g., waveforms) over each SRS resource.

The BS B may receive the SRSs 624*b* from the UE B based on SRS resources assigned by the BS B. The BS B may apply the spatial channel reservation information obtained from the RRS signals 622*a* when detecting the SRSs 624*a* from Operator A. For example, the BS B may receive two RRS signals 622*a* from Operator A and determine that Operator A has reserved two spatial layers or spatial layers for two UEs. The BS B may monitor SRS resources in the period 604 corresponding to the two reserved spatial layers or according to the reservation information obtained in RRS signals 622*a* instead of applying blind decoding on all SRS resources.

Subsequently, the BS A and the BS B separately estimate spatial channel information based on corresponding received SRSs 624*a* and 624*b* and determine pre-coding parameters based on the estimated spatial channel information.

When the communication is for DL, the BS A pre-codes data according to the determined pre-coding parameters and transmits the data 226*a* to a scheduled UE A during a sub-period 210. Alternatively, when the communication is for UL, the BS A may provide the pre-coding parameters to a scheduled UE A based on UL SRS reception and the UE A may pre-code data according to the provided pre-coding parameters and transmit the data 226*a* to the BS A during a sub-period 210. In some embodiments, the DL controls 230 and the UL controls 228 may also be pre-coded based on the pre-coding parameters.

In an embodiment, an RRQ signal 620 and/or an RRS signal 622 may indicate a transmission link direction (e.g., DL or UL) for a corresponding reservation. For example, when a high-priority operator indicates a spatial layer reserved for DL transmission, a low-priority operator may share the remaining unreserved spatial layers for communication in the same DL direction. This may reduce interference or ease interference management among the operators.

In an embodiment, an RRQ signal 620 and/or an RRS signal 622 may indicate whether sharing of remaining unreserved spatial layers by lower priority operators is allowed in a TXOP 202. For example, when a high-priority operator indicates that sharing of remaining unreserved spatial layers is allowed in a TXOP 202, a low-priority operator may schedule a UE in the remaining unreserved spatial layers. Conversely, when a high-priority operator indicates that sharing of remaining unreserved spatial layers is disallowed in a TXOP 202, a low-priority operator may refrain from accessing the medium (e.g., the spectrum 201) even when there are unreserved spatial layers available.

In an embodiment, to reduce RRS resource overhead, a scheduled UE may transmit a single RRS signal 622 irrespective of the number of scheduled spatial layers and a low-priority operator may assume a reservation for a full rank transmission upon detection of the RRS signal 622. For example, the BS B may obtain spatial layer information indicating that the UE A can support 4 spatial layers. Upon detection of an RRS signal 622*a* from the UE A, BS B may assume that all 4 spatial layers are reserved while the BS A may only schedule the UE A for 2 spatial layers.

In another embodiment, to reduce RRS resource overhead, scheduled UEs of an operator may transmit RRS signals 662 on an operator-specific common resource instead of UE-specific, spatial layer-specific resources. For example, the BS A may schedule two UEs for the TXOP 202 and both UEs may transmit RRS signals 622*a* on the same common resource. In such an embodiment, the BS B may determine an interference signature or pattern from the common resource and determine a number of scheduled or reserved spatial layers and/or a number of scheduled UEs based on the determined interference signature or pattern.

As shown above, to facilitate SDMA across operators, in some instances, a BS or a UE may receive a signal that is intended for the BS or the UE, while in some other instances, a BS or a UE may detect a signal that is not specifically intended for the BS or the UE, such as a signal intended for another BS or UE. While the scheme 600 is described in the context of one BS per operator, the scheme 600 may be employed by any suitable number of BSs to communicate with any suitable number of UEs. In addition, since the sharing of the spatial layers among operators is synchronized to the TXOP frame structure 605, the sharing is referred to as synchronous SDMA.

Figure 7:
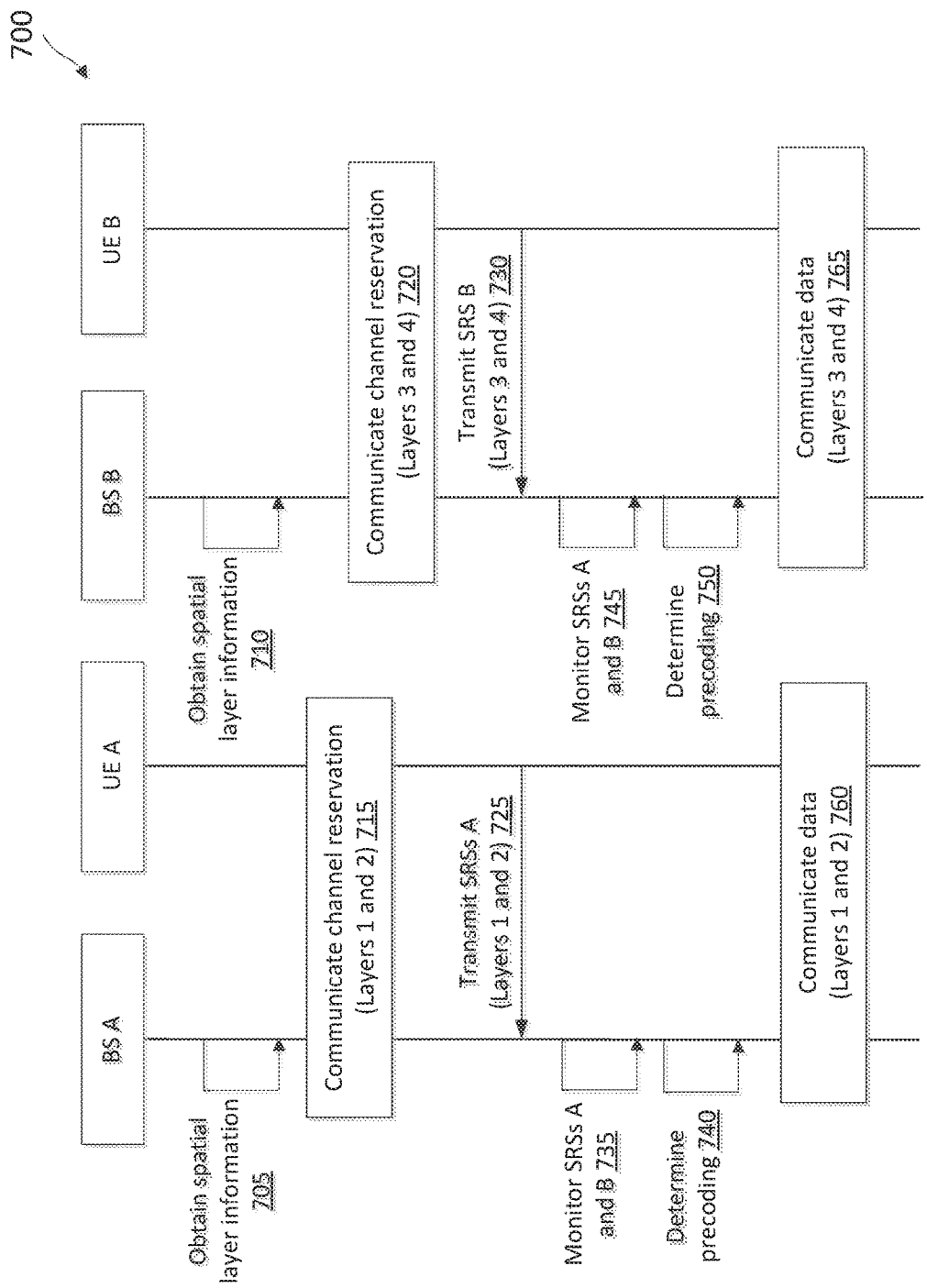
FIG. 7 is a signaling diagram of an SDMA-based medium sharing method according to embodiments of the present disclosure.

FIG. 7 is a signaling diagram of an SDMA-based medium sharing method 700 according to embodiments of the present disclosure. The method 700 is implemented among a BS A, a UE A, a BS B, and a UE B. The BSs A and B are similar to the BSs 105, 305, and 500. The UEs A and B are similar to the UEs 115, 315, and 400. Steps of the method 700 can be executed by computing devices (e.g., a processor, processing circuit, and/or other suitable component) of the BSs A and B and the UEs A and B. The method 700 may employ similar mechanisms as in the schemes 200 and 600 described with respect to FIGS. 2 and 6, respectively. As illustrated, the method 700 includes a number of enumerated steps, but embodiments of the method 700 may include additional steps before, after, and in between the enumerated steps. In some embodiments, one or more of the enumerated steps may be omitted or performed in a different order. As an example, the BS A and the UE A are operated by Operator A, while the BS B and the UE B are operated by Operator B, where Operator A has priority over Operator B in a particular TXOP (e.g., the TXOP 202) over a shared spectrum (e.g., the spectrum 201).

At step 705, the BS A obtains spatial layer information associated with Operator B. At step 710, the BS B obtains spatial layer information associated with Operator A. For example, each of the BSs A and B can support four spatial layers (e.g., layers 1, 2, 3, and 4).

At step 715, the BS A communicates channel reservation information with the UE A. The channel reservation information indicates a schedule for the UE A in the TXOP over the spatial layers 1 and 2. For example, the BS A and the UE A exchange RRQ and RRS signals as described in the scheme 600.

At step 720, the BS B communicates channel reservation information with the UE B. The channel reservation information indicates a schedule for the UE B in the TXOP over the other spatial layers 3 and 4. For example, the BS B determines that the spatial layers 1 and 2 are reserved by Operator A and the spatial layers 3 and 4 are available and exchanges RRQ and RRS signals with the UE B as described in the scheme 600.

At step 725, the UE A transmits an SRS A (e.g., the SRSs 624a) in each of the scheduled spatial layers 1 and 2, for example, according to an SRS trigger received from an RRQ signal of the BS A.

At step 730, the UE B transmits an SRS B (e.g., the SRSs 624b) in each of the scheduled spatial layers 3 and 4, for example, according to an SRS trigger received from an RRQ signal of the BS B.

At step 735, the BS A monitors for the SRSs A and B. Since the BS A scheduled the spatial layers 1 and 2 and allocated the SRS resources, the BS A may receive the SRSs A according to the allocated SRS resources. However, the BS A may not have prior knowledge regarding the spatial layers scheduled by the BS B and/or the SRS resources allocated by the BS B. Thus, the BS A may apply blind decoding to detect the SRSs B. At step 740, the BS A may determine pre-coding parameters based on the received SRSs A and B. For example, the pre-coding parameters may be in the form of a pre-coding matrix for the spatial layers 1, 2, 3, and 4.

At step 745, the BS B monitors for SRSs A and B. Since the BS B scheduled the spatial layers 1 and 2 and allocated the SRS resources, the BS B may receive the SRSs B according to the allocated SRS resources. As described above, the BS B may have prior knowledge regarding the number of spatial layers and/or the number of UEs scheduled by Operator A based on RRS signal detection. Thus, the BS B may leverage the reservation information (e.g., the scheduled spatial layers 1 and 2) obtained from the RRS signal detection to detect the SRSs A. For example, the BS B may monitor for the SRSs A in the SRS resources corresponding to the spatial layers 1 and 2. At step 750, the BS B may determine pre-coding parameters for the spatial layers 1, 2, 3, and 4 based on the received SRSs A and B.

At step 760, the BS A communicates data (e.g., the data 226a) with the UE A over the spatial layers 1 and 2. The data is pre-coded based on the pre-coding parameters determined at the step 740.

At step 765, the BS B communicates data (e.g., the data 226b) with the UE B over the spatial layers 3 and 4. The data is pre-coded based on the pre-coding parameters determined at the step 750.

Figure 8:
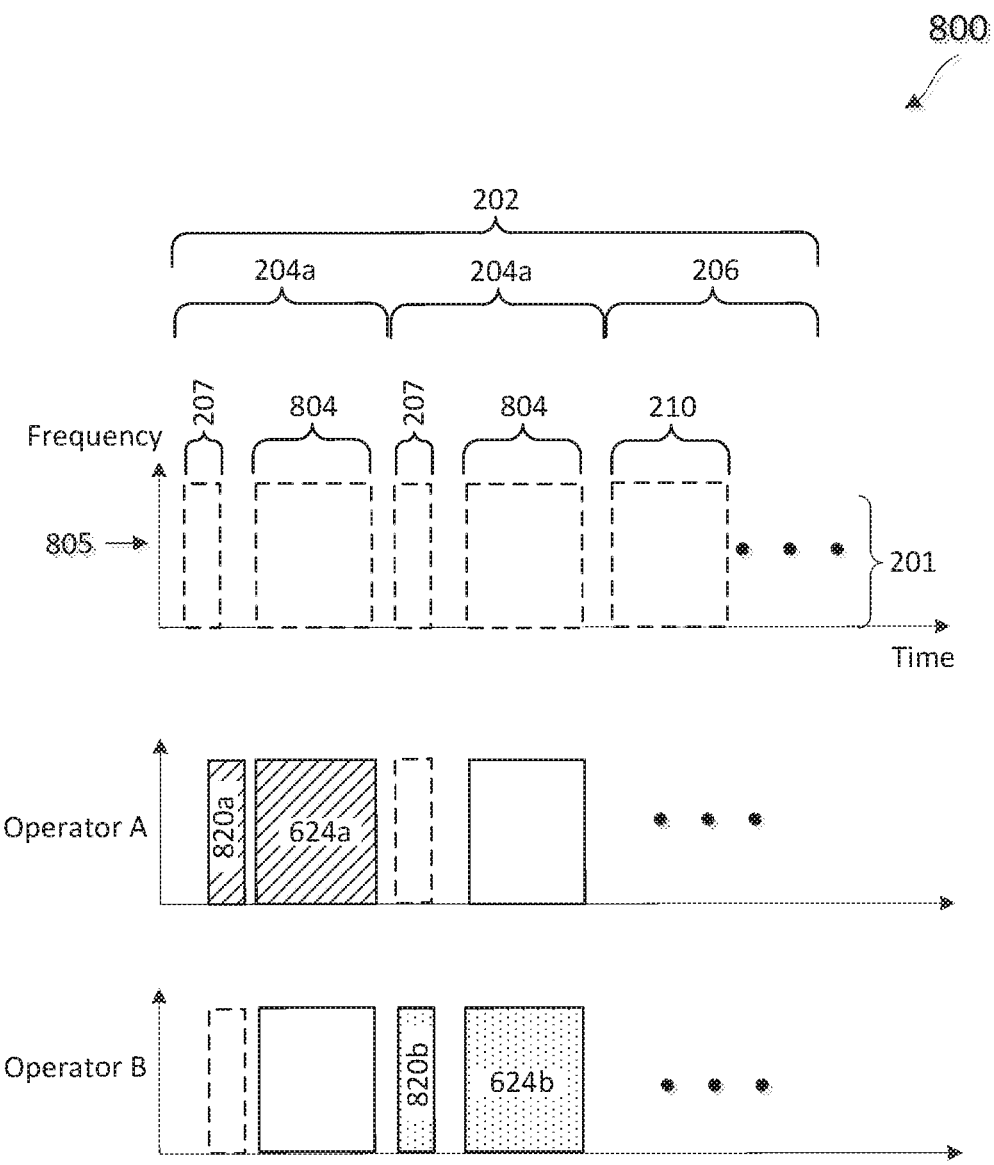
FIG. 8 illustrates an SDMA-based medium sharing scheme according to embodiments of the present disclosure.
Figure 9:
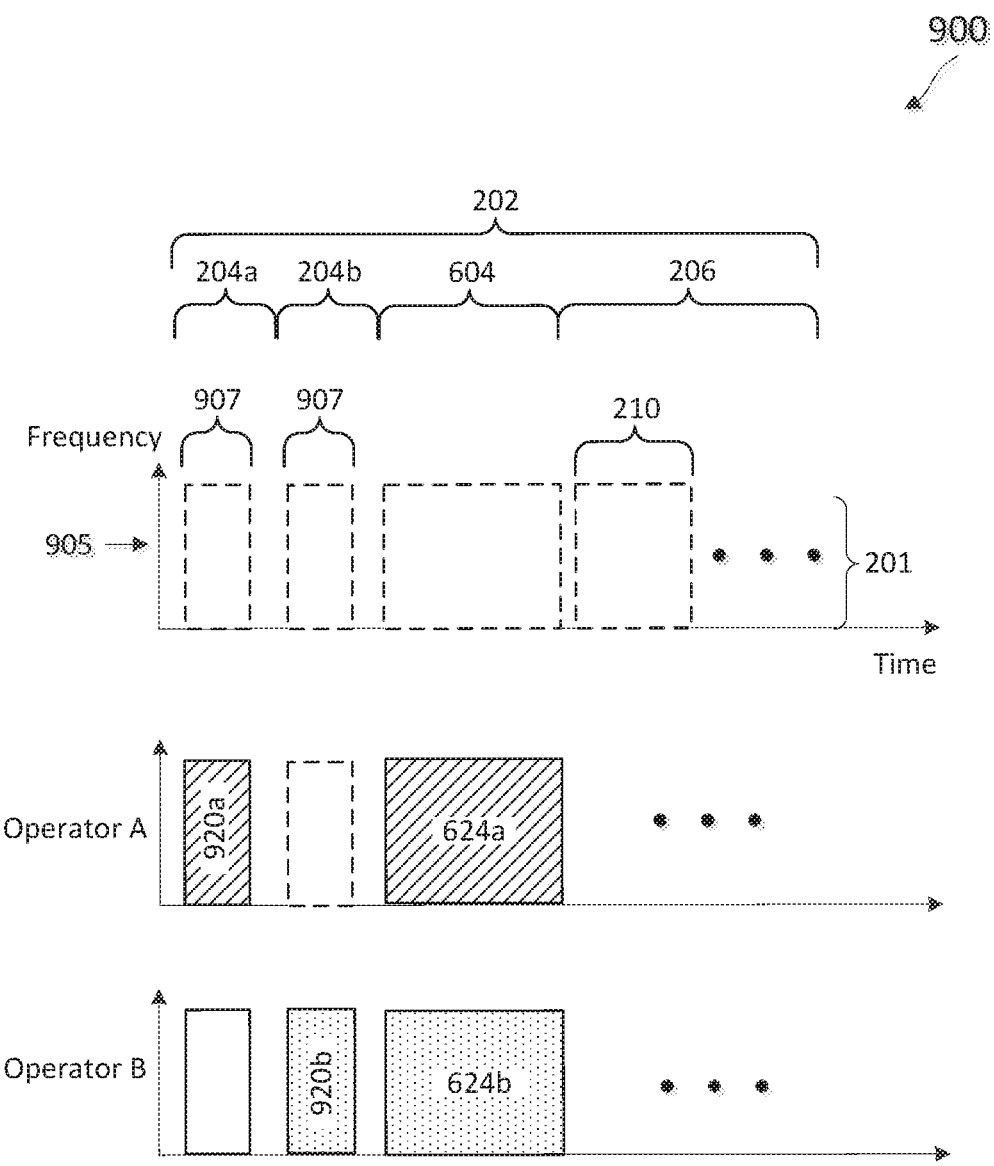
FIG. 9 illustrates an SDMA-based medium sharing scheme according to embodiments of the present disclosure.
Figure 10:
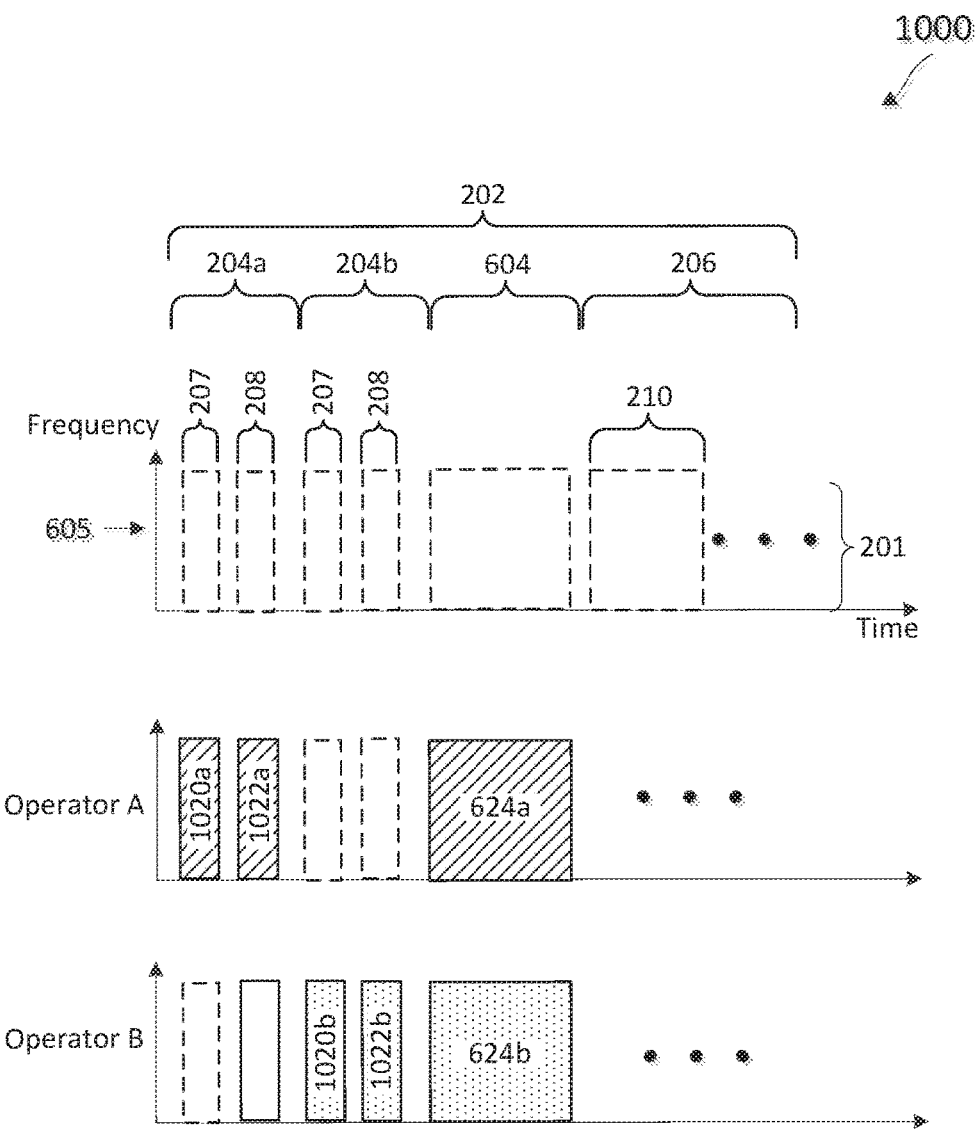
FIG. 10 illustrates an SDMA-based medium sharing scheme according to embodiments of the present disclosure.

FIGS. 8-10 illustrate various signaling mechanisms for SDMA-based medium sharing that may be employed by the BSs 105, 305, and 500 and the UEs 115, 315, and 400. FIGS. 8-10 are described in the context where Operator A has priority over Operator B in a particular TXOP 202 similar to the scheme 600 and the method 700. In FIGS. 8-10, the x-axes represent time in some constant units and the y-axes represent frequency in some constant units.

FIG. 8 illustrates an SDMA-based medium sharing scheme 800 according to embodiments of the present disclosure. The scheme 800 is similar to the scheme 600, but uses SRS waveforms for channel sounding and medium reservations. As shown in the frame structure 805, each CCA period 204 includes a portion 207 and an SRS period 804. The SRS periods 804 may be substantially similar to the SRS periods 604, but are operator-specific.

In the scheme 800, a BS A of Operator A (e.g., the high-priority operator) transmits an RRQ signal 820a in the portion 207 of the CCA period 204a to schedule a UE A of Operator A over one or more spatial layers in the transmission period 206. The RRQ signal 820a may be substantially similar to the RRQ signal 620a. For example, the RRQ signal 820a may include a schedule and an SRS trigger for the UE A. The SRS trigger may indicate SRS resources in the SRS period 804 of the CCA period 204a. The UE A responds by transmitting an SRS 624a according to each scheduled spatial layer according to the SRS trigger.

A BS B of Operator B (e.g., the low-priority operator) may apply blind decoding to detect the SRSs 624a from the SRS period 804 of the CCA period 204a. The BS B may determine the spatial layers reserved by Operator A based on the detected SRSs 624a. The BS B may schedule a UE B of Operator B over one or more remaining unreserved spatial layers in the transmission period 206. The BS B transmits an RRQ signal 820b in the portion 207 of the CCA period 204b indicating a schedule and an SRS trigger for the UE B. The SRS trigger may indicate SRS resources in the SRS period 804 of the CCA period 204b. The UE B responds by transmitting an SRS 624b according to each scheduled spatial layer according to the SRS trigger. The BS B receives the SRSs 624b based on the SRS resources assigned by the BS B.

The BS A receives the SRSs 624a based on the SRS resources assigned by the BS A. The BS A may apply blind decoding to detect the SRSs 624b from the SRS period 804 of the CCA period 204b. Subsequently, the BS A and the BS B perform SDMA pre-coding based on corresponding received and/or detected SRSs 624a and 624b using similar mechanisms as describe in the scheme 600.

As can be seen, the scheme 800 can reduce resource overhead by using SRS waveforms for both channel sounding and medium reservations. However, in some embodiments, the scheme 800 may not provide the same channel sounding and/or medium sharing performance as the scheme 600 and may increase processing complexity at low-priority operators due to the blind decoding. While the scheme 800 is described in the context of one BS per operator, the scheme 800 may be employed by any suitable number of BSs to communicate with any suitable number of UEs.

FIG. 9 illustrates an SDMA-based medium sharing scheme 900 according to embodiments of the present disclosure. The scheme 900 is similar to the scheme 600 and 800, but enables spatial layer sharing at a finer granularity such as at a sub-period or TTI granularity. For example, a granting BS may schedule different UEs in different TTIs or scheduling sub-periods 210 within a TXOP 202. As shown in the frame structure 905, each CCA period 204 includes a portion 907. Each portion 907 can include FDM and/or TDM resources for RRQ signal transmissions (e.g., a preamble) and scheduling information transmission.

In the scheme 900, a BS A of the Operator A (e.g., the high-priority operator) transmits an RRQ signal 920a in the portion 907 of the CCA period 204a to schedule a set of UEs A for the sub-periods 210. The RRQ signal 920a may indicate spatial layer scheduling and SRS resource information for each scheduled UE A in each sub-period 210. The RRQ signal 920a may include a preamble similar to the RRQ signals 220. The RRQ signal 920a may indicate a link direction for each sub-period 210 and/or whether a low-priority operator may share the remaining unreserved spatial layers.

To enable other operators to decode the spatial layer scheduling and SRS resource information, the RRQ signal 920a may be transmitted using similar mechanisms as in the LTE physical downlink control channel (PDCCH). For example, the resources in the portion 907 for carrying the explicit scheduling information can be divided into a plurality of predetermined search spaces. A search space may carry spatial layer scheduling and SRS resource information for a UE scheduled in a sub-period 210 of the TXOP 202.

A BS B of the Operator B (e.g., the low-priority operator) monitors for an RRQ signal 920a from Operator A. Upon detecting the RRQ signal 920a, the BS B may apply blind decoding to each search space to determine spatial layer scheduling and SRS resource information of Operator A for each sub-period 210. The BS B may schedule one or more UEs B in the sub-periods 210 using remaining available spatial layers based on the spatial layer scheduling information. The BS B may schedule a UEs B in a sub-period 210 in the same transmission link direction as indicated by the BS A. The BS B may skip scheduling in a particular sub-period 210 when the BS A indicates that spatial layer sharing is not allowed in the particular sub-period 210. The BS B transmits an RRQ signal 920b to indicate spatial layer scheduling information and SRS resources for each scheduled UE B in the sub-periods 210 using similar mechanisms as the BS A.

Subsequently, each of the scheduled UEs A and B transmit an SRS 624 for each corresponding scheduled spatial layer in the SRS period 604 according to the SRS resource information. The BS A receives the SRSs 624a from the UEs A based on the SRS resources assigned by the BS A and detects the SRSs 624b based on the SRS resource information detected from the RRQ signal 920b. Similarly, the BS B receives the SRSs 624b from the UEs B based on the SRS resources assigned by the BS B and detects the SRSs 624a based on the SRS resource information detected from the RRQ signal 920a. The BS A and the BS B separately determines pre-coding parameters for each sub-period 210 based on corresponding received SRSs 624a and 624b.

FIG. 10 illustrates an SDMA-based medium sharing scheme 1000 according to embodiments of the present disclosure. The scheme 1000 is similar to the scheme 900, but all granting BSs and all scheduled UEs of a particular operator transmit per TTI spatial layer scheduling and SRS resource information simultaneously, for example, in a single frequency network (SFN) manner The scheme 1000 uses the same frame structure 605 as the scheme 600. However, the portions 208 may carry the simultaneous transmissions of the granting BSs and scheduled UEs.

In the scheme 1000, a BS A of the Operator A (e.g., the high-priority operator) transmits an RRQ signal 1020a in the portion 207 of the CCA period 204a to schedule a set of UEs A for the sub-periods 210. The RRQ signal 1020a may be similar to the RRQ signal 620a, but may include spatial layer scheduling and SRS resource information for each scheduled UE A in each sub-period 210.

All scheduled UEs A and the granting BS A may simultaneously transmit an RRS signal 1022a in the portion 208 of the CCA period 204a. The RRS signals 1022a may include a preamble or a predetermined sequence and the spatial layer scheduling and SRS resource information. The simultaneous transmissions can increase reception quality and detection performance at other operators.

A BS B of the Operator B (e.g., the low-priority operator) may determine spatial layer scheduling and SRS resource information of Operator A for each sub-period 210 by monitoring for RRS signals 1022a. For example, the BS B may decode the spatial layer scheduling and SRS resource information by using the preamble or predetermined sequence in the RRS signal as a reference signal for demodulation. The BS B may schedule one or more UEs B in the sub-periods 210 using remaining available spatial layers based on the spatial layer scheduling information. The BS B transmits an RRQ signal 1020b to indicate spatial layer scheduling and SRS resource information for each scheduled UE B in each sub-period 210 using similar mechanisms as the BS A. All scheduled UEs B and the granting BS B may simultaneously transmit an RRS signal 1022b in the portion 208 of the CCA period 204b echoing the spatial layer scheduling and SRS resource information.

Subsequently, each of the scheduled UEs A and B transmit an SRS 624 in each corresponding scheduled spatial layer in the SRS period 604 according to the spatial layer scheduling and SRS resource information. The BS A receives the SRSs 624a from the UEs A based on the SRS resources assigned by the BS A and detects the SRSs 624b based on the SRS resource information detected from the RRS signals 1022b. Similarly, the BS B receives the SRSs 624b from the UEs B based on the SRS resources assigned by the BS B and detects the SRSs 624a based on the SRS resource information detected from the RRS signals 1022a. The BS A and the BS B separately determine pre-coding parameters for each sub-period 210 based on corresponding received SRSs 624a and 624b. In some embodiments, the RRQ signals 1020 and/or the RRS signals 1022 may indicate additional reservation information such as a transmission link direction in a particular sub-period 210 and/or whether sharing of remaining unreserved spatial layers is allowable.

The schemes 900 and 1000 can provide several benefits. For example, the spatial layer sharing at the finer granularity allows operators to better adapt to traffic and/or channel conditions. In addition, the scheme 900 and 1000 allows unscheduled UEs to switch off certain components in the transceiver chains during the transmission period 206, and thus provide power-saving at the unscheduled UEs.

Figure 11:
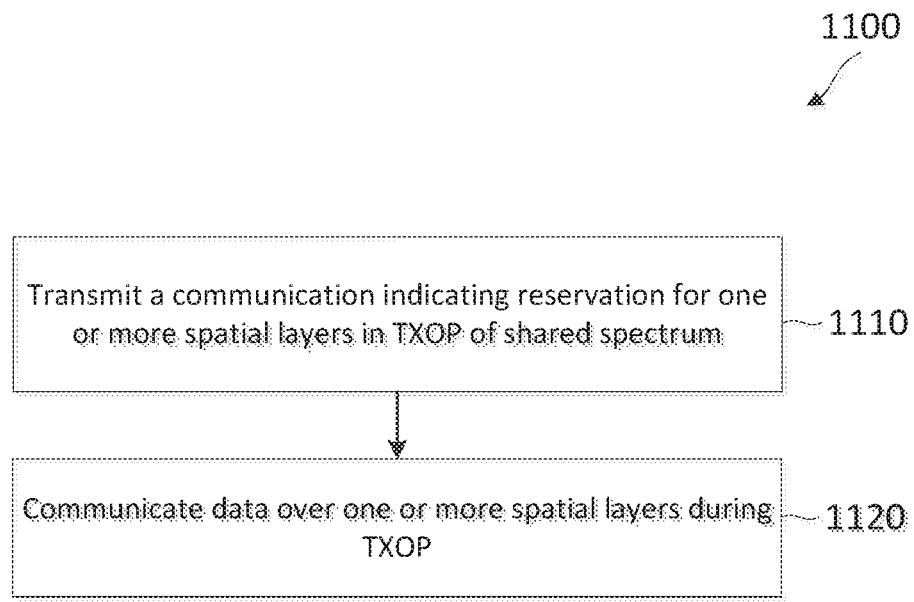
FIG. 11 is a flow diagram of an SDMA-based medium sharing method according to embodiments of the present disclosure.

FIG. 11 is a flow diagram of an SDMA-based medium sharing method 1100 according to embodiments of the present disclosure. Steps of the method 1100 can be executed by a computing device (e.g., a processor, processing circuit, and/or other suitable component) of a wireless communication device, such as the BSs 105, 305, and 500 and the UEs 115, 315, and 400. The method 1100 may employ similar mechanisms as in the schemes 200, 600, 800, 900, 1000 and the method 700 described with respect to FIGS. 2, 6, 8, 9, 10, and 7 respectively. As illustrated, the method 1100 includes a number of enumerated steps, but embodiments of the method 1100 may include additional steps before, after, and in between the enumerated steps. In some embodiments, one or more of the enumerated steps may be omitted or performed in a different order.

At step 1110, the method 1100 includes transmitting a communication indicating a reservation for one or more spatial layers in a TXOP (e.g., the TXOP 102) of a shared spectrum (e.g., the shared spectrum 101). The shared spectrum is shared by the plurality of network operating entities (e.g., Operator A and Operator B) based on priorities. For example, the wireless communication device is associated with a first network operating entity (e.g., Operator A) of the plurality of the network operating entities. In one embodiment, the communication includes RRS signals such as the RRS signals 622 or 1022 in the described with respect to schemes 600 or 1000, respectively. In one embodiment, the communication includes SRSs such as the SRSs 624 described with respect to the scheme 800. In one embodiment, the communication includes RRQ signals such as the RRQ signals 920 described with respect to the scheme 900.

At step 1120, the method 1100 includes communicating data (e.g., the data 226) over the one or more spatial layers during the TXOP. The data are pre-coded based on spatial channel information determined as described above.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Embodiments of the present disclosure include a method of wireless communication includes transmitting, by a first wireless communication device associated with a first network operating entity, a communication indicating a reservation for one or more spatial layers in a transmission opportunity (TXOP) of a shared spectrum, wherein the shared spectrum is shared by the first network operating entity and a second network operating entity; and communicating, by the first wireless communication device with a second wireless communication device associated with the first network operating entity, data over the one or more spatial layers during the TXOP.

The method further includes wherein the transmitting includes transmitting one or more reservation response (RRS) signals using one or more resources designated to the first wireless communication device, and wherein each of the one or more resources corresponds to one of the one or more spatial layers. The method further includes wherein the transmitting includes transmitting one or more reservation response (RRS) signals to indicate the one or more spatial layers reserved in the TXOP using a same resource as an RRS signal transmission of another wireless communication device associated with the first network operating entity. The method further includes wherein the transmitting includes transmitting one or more sounding reference signals (SRSs) using one or more resources designated to the first wireless communication device, wherein each of the one or more resources corresponds to one of the one or more spatial layers, and wherein each of the one or more SRSs provides spatial channel information for a corresponding spatial layer of the one or more spatial layers. The method further includes receiving, by the first wireless communication device from the second wireless communication device, a reservation request (RRQ) signal indicating a first schedule in the TXOP for the first wireless communication device, and wherein the transmitting is in response to the RRQ signal. The method further includes wherein the RRQ signal further indicates a second schedule in the TXOP for another wireless communication device associated with the first network operating entity, and wherein the transmitting includes transmitting a reservation response (RRS) signal including the first schedule and the second schedule. The method further includes wherein the transmitting includes transmitting a reservation request (RRQ) signal indicating a first schedule for communication with the second wireless communication device over the one or more spatial layers during the TXOP. The method further includes generating, by the first wireless communication device, the RRQ signal by encoding the first schedule based on a first search space; and encoding a second schedule in the TXOP based on a second search space different from the first search space. The method further includes wherein the reservation further indicates a transmission link direction, and wherein the communicating the data includes communicating the data in the transmission link direction. The method further includes wherein the first network operating entity includes a number of supportable spatial layers including the one or more spatial layers, and wherein the reservation further indicates whether sharing of remaining unreserved supportable spatial layers is allowed. The method further includes receiving, by the first wireless communication device from the second wireless communication device, a first set of sounding reference signals (SRSs) corresponding to the one or more spatial layers, wherein the data is pre-coded based on at least the first set of SRSs. The method further includes detecting, by the first wireless communication device, a second set of SRSs from the second network operating entity corresponding to one or more other spatial layers, wherein the data is further pre-coded based on the second set of SRSs. The method further includes obtaining, by the first wireless communication device, spatial layer information indicating supportable spatial layers of the second network operating entity, wherein the supportable spatial layers include the one or more spatial layers and the one or more other spatial layers; detecting, by the first wireless communication device, another reservation for the TXOP from the second network operating entity reserving the one or more other spatial layers; and determining, by the first wireless communication device, the one or more spatial layers for communication with the second wireless communication device in the TXOP based on at least the another reservation and the spatial layer information. The method further includes wherein the detecting the another reservation includes receiving one or more reservation response (RRS) signals indicating the one or more other spatial layers. The method further includes wherein the detecting the another reservation includes the receiving the second set of SRSs. The method further includes wherein the detecting the another reservation includes receiving a reservation request (RRQ) signal; and determining, by applying blind decoding on the RRQ signal over one or more search spaces, that the one or more other spatial layers are reserved for at least one of a first scheduling period within the TXOP or a transmission link direction. The method further includes wherein the detecting the another reservation includes receiving a reservation response (RRS) signal; and determining, by demodulating the RRS signal, that the one or more other spatial layers are reserved for at least one of a first scheduling period within the TXOP or a transmission link direction. The method further includes comprising determining, by the first wireless communication device, that sharing of unreserved supportable spatial layers is allowed based on the another reservation. The method further includes determining, by the first wireless communication device, that the one or more other spatial layers are reserved for a first scheduling period within the TXOP based on the another reservation, wherein the communicating the data includes communicating the data in the first scheduling period. The method further includes determining, by the first wireless communication device, that the one or more other spatial layers are reserved for a transmission link direction based on the another reservation, wherein the communicating further includes communicating the data in the transmission link direction.

Embodiments of the present disclosure further include an apparatus comprising a transceiver configured to transmit a communication indicating a reservation for one or more spatial layers in a transmission opportunity (TXOP) of a shared spectrum, wherein the shared spectrum is shared by a first network operating entity and a second network operating entity, and wherein the apparatus is associated with the first network operating entity; and communicate, with a second wireless communication device associated with the first network operating entity, data over the one or more spatial layers during the TXOP.

The apparatus further includes wherein the transceiver is further configured to transmit the communication by transmitting one or more reservation response (RRS) signals using one or more resources designated to the apparatus, and wherein each of the one or more resources corresponds to one of the one or more spatial layers. The apparatus further includes wherein the transceiver is further configured to transmit the communication by transmitting one or more reservation response (RRS) signals to indicate the one or more spatial layers reserved in the TXOP using a same resource as an RRS signal transmission of another wireless communication device associated with the first network operating entity. The apparatus further includes wherein the transceiver is further configured to transmit the communication by transmitting one or more sounding reference signals (SRSs) using one or more resources designated to the apparatus, wherein each of the one or more resources corresponds to one of the one or more spatial layers, and wherein each of the one or more SRSs provides spatial channel information for a corresponding spatial layer of the one or more spatial layers. The apparatus further includes wherein the transceiver is further configured to receive, from the second wireless communication device, a reservation request (RRQ) signal indicating a first schedule in the TXOP for the apparatus, and wherein the communication is transmitted in response to the RRQ signal. The apparatus further includes wherein the RRQ signal further indicates a second schedule in the TXOP for another wireless communication device associated with the first network operating entity, and wherein the transceiver is further configured to transmit the communication by transmitting a reservation response (RRS) signal including the first schedule and the second schedule. The apparatus further includes wherein the transceiver is further configured to transmit the communication by transmitting a reservation request (RRQ) signal indicating a first schedule for communication with the second wireless communication device over the one or more spatial layers during the TXOP. The apparatus further includes a processor configured to generate the RRQ signal by encoding the first schedule based on a first search space; and encoding a second schedule in the TXOP based on a second search space different from the first search space. The apparatus further includes wherein the reservation further indicates a transmission link direction, and wherein the transceiver is further configured to communicate the data by communicating the data in the transmission link direction. The apparatus further includes wherein the first network operating entity includes a number of supportable spatial layers including the one or more spatial layers, and wherein the reservation further indicates whether sharing of remaining unreserved supportable spatial layers is allowed. The apparatus further includes wherein the transceiver is further configured to receive, from the second wireless communication device, a first set of sounding reference signals (SRSs) corresponding to the one or more spatial layers, and wherein the data is pre-coded based on at least the first set of SRSs. The apparatus further includes a processor configured to detect a second set of SRSs from the second network operating entity corresponding to one or more other spatial layers, wherein the data is further pre-coded based on the second set of SRSs. The apparatus further includes a processor configured to obtain spatial layer information indicating supportable spatial layers of the second network operating entity, wherein the supportable spatial layers include the one or more spatial layers and the one or more other spatial layers; detect another reservation for the TXOP from the second network operating entity reserving the one or more other spatial layers; and determine the one or more spatial layers for communication with the second wireless communication device in the TXOP based on at least the another reservation and the spatial layer information. The apparatus further includes wherein the processor is further configured to detect the another reservation by receiving one or more reservation response (RRS) signals indicating the one or more other spatial layers. The apparatus further includes wherein the processor is further configured to detect the another reservation by receiving the second set of SRSs. The apparatus further includes wherein the processor is further configured to detect the another reservation by receiving a reservation request (RRQ) signal; and determining, by applying blind decoding on the RRQ signal over one or more search spaces, that the one or more other spatial layers are reserved for at least one of a first scheduling period within the TXOP or a transmission link direction. The apparatus further includes wherein the processor is further configured to detect the another reservation by receiving a reservation response (RRS) signal; and determining, by demodulating the RRS signal, that the one or more other spatial layers are reserved for at least one of a first scheduling period within the TXOP or a transmission link direction. The apparatus further includes wherein the processor is further configured to determine that sharing of unreserved supportable spatial layers is allowed based on the another reservation. The apparatus further includes wherein the processor is further configured to determine that the one or more other spatial layers are reserved for a first scheduling period within the TXOP based on the another reservation, and wherein the communicating the data includes communicating the data in the first scheduling period. The apparatus further includes wherein the processor is further configured to determine that the one or more other spatial layers are reserved for a transmission link direction based on the another reservation, and wherein the communicating further includes communicating the data in the transmission link direction.

Embodiments of the present disclosure include a computer-readable medium having program code recorded thereon, the program code comprising code for causing a first wireless communication device associated with a first network operating entity to transmit a communication indicating a reservation for one or more spatial layers in a transmission opportunity (TXOP) of a shared spectrum, wherein the shared spectrum is shared by the first network operating entity and a second network operating entity; and code for causing the first wireless communication device to communicate, with a second wireless communication device associated with the first network operating entity, data over the one or more spatial layers during the TXOP.

The computer-readable medium further includes wherein the code for causing the first wireless communication device to transmit the communication is further configured to transmit one or more reservation response (RRS) signals using one or more resources designated to the first wireless communication device, and wherein each of the one or more resources corresponds to one of the one or more spatial layers. The computer-readable medium further includes wherein the code for causing the first wireless communication device to transmit the communication is further configured to transmit one or more reservation response (RRS) signals to indicate the one or more spatial layers reserved in the TXOP using a same resource as an RRS signal transmission of another wireless communication device associated with the first network operating entity. The computer-readable medium further includes wherein the code for causing the first wireless communication device to transmit the communication is further configured to transmit one or more sounding reference signals (SRSs) using one or more resources designated to the first wireless communication device, wherein each of the one or more resources corresponds to one of the one or more spatial layers, and wherein each of the one or more SRSs provides spatial channel information for a corresponding spatial layer of the one or more spatial layers. The computer-readable medium further includes code for causing the first wireless communication device to receive, from the second wireless communication device, a reservation request (RRQ) signal indicating a first schedule in the TXOP for the first wireless communication device, wherein the code for causing the first wireless communication device to transmit the communication is further configured to the transmit the communication is in response to the RRQ signal. The computer-readable medium further includes wherein the RRQ signal further indicates a second schedule in the TXOP for another wireless communication device associated with the first network operating entity, and wherein the code for causing the first wireless communication device to transmit the communication is further configured to transmit a reservation response (RRS) signal including the first schedule and the second schedule. The computer-readable medium further includes wherein the code for causing the first wireless communication device to transmit the communication is further configured to transmit a reservation request (RRQ) signal indicating a first schedule for communication with the second wireless communication device over the one or more spatial layers during the TXOP. The computer-readable medium further includes code for causing the first wireless communication device to generate the RRQ signal by encoding the first schedule based on a first search space; and encoding a second schedule in the TXOP based on a second search space different from the first search space. The computer-readable medium further includes wherein the reservation further indicates a transmission link direction, and wherein the code for causing the first wireless communication device to communicate the data is further configured to communicate the data in the transmission link direction. The computer-readable medium further includes wherein the first network operating entity includes a number of supportable spatial layers including the one or more spatial layers, and wherein the reservation further indicates whether sharing of remaining unreserved supportable spatial layers is allowed. The computer-readable medium further includes code for causing the first wireless communication device to receive, from the second wireless communication device, a first set of sounding reference signals (SRSs) corresponding to the one or more spatial layers, wherein the data is pre-coded based on at least the first set of SRSs. The computer-readable medium further includes code for causing the first wireless communication device to detect a second set of SRSs from the second network operating entity corresponding to one or more other spatial layers, wherein the data is further pre-coded based on the second set of SRSs. The computer-readable medium further includes code for causing the first wireless communication device to obtain spatial layer information indicating supportable spatial layers of the second network operating entity, wherein the supportable spatial layers include the one or more spatial layers and the one or more other spatial layers; code for causing the first wireless communication device to detect another reservation for the TXOP from the second network operating entity reserving the one or more other spatial layers; and code for causing the first wireless communication device to determine the one or more spatial layers for communication with the second wireless communication device in the TXOP based on at least the another reservation and the spatial layer information. The computer-readable medium further includes wherein the code for causing the first wireless communication device to detect the another reservation is further configured to receive one or more reservation response (RRS) signals indicating the one or more other spatial layers. The computer-readable medium further includes wherein the code for causing the first wireless communication device to detect the another reservation is further configured to receive the second set of SRSs. The computer-readable medium further includes wherein the code for causing the first wireless communication device to detect the another reservation is further configured to receive a reservation request (RRQ) signal; and determine, by applying blind decoding on the RRQ signal over one or more search spaces, that the one or more other spatial layers are reserved for at least one of a first scheduling period within the TXOP or a transmission link direction. The computer-readable medium further includes wherein the code for causing the first wireless communication device to detect the another reservation is further configured to receive a reservation response (RRS) signal; and determine, by demodulating the RRS signal, that the one or more other spatial layers are reserved for at least one of a first scheduling period within the TXOP or a transmission link direction. The computer-readable medium further includes code for causing the first wireless communication device to determine that sharing of unreserved supportable spatial layers is allowed based on the another reservation. The computer-readable medium further includes code for causing the first wireless communication device to determine that the one or more other spatial layers are reserved for a first scheduling period within the TXOP based on the another reservation, wherein the code for causing the first wireless communication device to communicate the data is further configured to communicate the data in the first scheduling period. The computer-readable medium further includes code for causing the first wireless communication device to determine that the one or more other spatial layers are reserved for a transmission link direction based on the another reservation, wherein the communicating further includes communicating the data in the transmission link direction.

Embodiments of the present disclosure further include an apparatus comprising means for transmitting a communication indicating a reservation for one or more spatial layers in a transmission opportunity (TXOP) of a shared spectrum, wherein the shared spectrum is shared by a first network operating entity and a second network operating entity, and wherein the apparatus is associated with the first network operating entity; and means for communicating, with a second wireless communication device associated with the first network operating entity, data over the one or more spatial layers during the TXOP.

The apparatus further includes wherein the means for transmitting the communication is further configured to transmit one or more reservation response (RRS) signals using one or more resources designated to the apparatus, and wherein each of the one or more resources corresponds to one of the one or more spatial layers. The apparatus further includes wherein the means for transmitting the communication is further configured to transmit one or more reservation response (RRS) signals to indicate the one or more spatial layers reserved in the TXOP using a same resource as an RRS signal transmission of another wireless communication device associated with the first network operating entity. The apparatus further includes wherein the means for transmitting the communication is further configured to transmit one or more sounding reference signals (SRSs) using one or more resources designated to the apparatus, wherein each of the one or more resources corresponds to one of the one or more spatial layers, and wherein each of the one or more SRSs provides spatial channel information for a corresponding spatial layer of the one or more spatial layers. The apparatus further includes means for receiving, from the second wireless communication device, a reservation request (RRQ) signal indicating a first schedule in the TXOP for the apparatus, wherein the communication is transmitted in response to the RRQ signal. The apparatus further includes wherein the RRQ signal further indicates a second schedule in the TXOP for another wireless communication device associated with the first network operating entity, and wherein the means for transmitting the communication is further configured to transmit a reservation response (RRS) signal including the first schedule and the second schedule. The apparatus further includes wherein the means for transmitting the communication is further configured to transmit a reservation request (RRQ) signal indicating a first schedule for communication with the second wireless communication device over the one or more spatial layers during the TXOP. The apparatus further includes means for generating the RRQ signal by encoding the first schedule based on a first search space; and encoding a second schedule in the TXOP based on a second search space different from the first search space. The apparatus further includes wherein the reservation further indicates a transmission link direction, and wherein the means for communicating the data is further configured to communicating the data in the transmission link direction. The apparatus further includes wherein the first network operating entity includes a number of supportable spatial layers including the one or more spatial layers, and wherein the reservation further indicates whether sharing of remaining unreserved supportable spatial layers is allowed. The apparatus further includes means for receiving, from the second wireless communication device, a first set of sounding reference signals (SRSs) corresponding to the one or more spatial layers, wherein the data is pre-coded based on at least the first set of SRSs. The apparatus further includes means for detecting a second set of SRSs from the second network operating entity corresponding to one or more other spatial layers, wherein the data is further pre-coded based on the second set of SRSs. The apparatus further includes means for obtaining spatial layer information indicating supportable spatial layers of the second network operating entity, wherein the supportable spatial layers include the one or more spatial layers and the one or more other spatial layers; means for detecting another reservation for the TXOP from the second network operating entity reserving the one or more other spatial layers; and means for determining the one or more spatial layers for communication with the second wireless communication device in the TXOP based on at least the another reservation and the spatial layer information. The apparatus further includes wherein the means for detecting the another reservation is further configured to receive one or more reservation response (RRS) signals indicating the one or more other spatial layers. The apparatus further includes wherein the means for detecting the another reservation is further configured to receive the second set of SRSs. The apparatus further includes wherein the means for detecting the another reservation is further configured to receive a reservation request (RRQ) signal; and determine, by applying blind decoding on the RRQ signal over one or more search spaces, that the one or more other spatial layers are reserved for at least one of a first scheduling period within the TXOP or a transmission link direction. The apparatus further includes wherein the means for detecting the another reservation is further configured to receive a reservation response (RRS) signal; and determine, by demodulating the RRS signal, that the one or more other spatial layers are reserved for at least one of a first scheduling period within the TXOP or a transmission link direction. The apparatus further includes means for determining that sharing of unreserved supportable spatial layers is allowed based on the another reservation. The apparatus further includes wherein the means for determining that the one or more other spatial layers are reserved for a first scheduling period within the TXOP based on the another reservation, and wherein the means for communicating the data is further configured to communicate the data in the first scheduling period. The apparatus further includes means for determining that the one or more other spatial layers are dreserved for a transmission link direction based on the another reservation, wherein the means for communicating the data is further configured to communicate the data in the transmission link direction.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
communicating, by a first wireless communication device with a second wireless communication device, a communication indicating a reservation for one or more spatial layers in a transmission opportunity (TXOP) of a shared spectrum, wherein the shared spectrum is shared by a first network operating entity and a second network operating entity, wherein the first wireless communication device and the second wireless communication device are associated with the first network operating entity, wherein the first network operating entity includes a number of supportable spatial layers including the one or more spatial layers, and wherein the reservation further indicates whether sharing of remaining unreserved supportable spatial layers is allowed; and
communicating, by the first wireless communication device with the second wireless communication device, data over the one or more spatial layers during the TXOP.

2. The method of claim 1, wherein the communicating the communication includes communicating, by the first wireless communication device with the second wireless communication device, one or more reservation response (RRS) signals using one or more resources designated to the first wireless communication device or the second wireless communication device, and wherein each of the one or more resources corresponds to one of the one or more spatial layers.

3. The method of claim 1, wherein the communicating the communication includes communicating, by the first wireless communication device with the second wireless communication device, one or more reservation response (RRS) signals to indicate the one or more spatial layers reserved in the TXOP using a same resource as an RRS signal transmission of another wireless communication device associated with the first network operating entity.

4. The method of claim 1, wherein the communicating the communication includes communicating, by the first wireless communication device with the second wireless communication device, one or more sounding reference signals (SRSs) using one or more resources designated to the first wireless communication device or the second wireless communication device, wherein each of the one or more resources corresponds to one of the one or more spatial layers, and wherein each of the one or more SRSs provides spatial channel information for a corresponding spatial layer of the one or more spatial layers.

5. The method of claim 1, wherein the communicating the communication includes communicating, by the first wireless communication device with the second wireless communication device, a reservation request (RRQ) signal indicating a first schedule for communicating the data with the second wireless communication device over the one or more spatial layers during the TXOP, and wherein the method further comprises communicating, by the first wireless communication device with the second wireless communication device in response to the RRQ signal, a reservation response (RRS) signal.

6. The method of claim 5, wherein the RRQ signal further indicates a second schedule in the TXOP for another wireless communication device associated with the first network operating entity, and wherein the RRS signal includes the first schedule and the second schedule.

7. The method of claim 1, wherein the communicating the communication includes transmitting a reservation request (RRQ) signal indicating a first schedule for communicating the data with the second wireless communication device over the one or more spatial layers during the TXOP.

8. The method of claim 7, further comprising generating, by the first wireless communication device, the RRQ signal by:
encoding the first schedule based on a first search space; and
encoding a second schedule in the TXOP based on a second search space different from the first search space.

9. The method of claim 1, wherein the reservation further indicates a transmission link direction, and wherein the communicating the data includes communicating the data in the transmission link direction.

10. The method of claim 1, further comprises receiving, by the first wireless communication device from the second wireless communication device, a first set of sounding reference signals (SRSs) corresponding to the one or more spatial layers, wherein the data is pre-coded based on at least the first set of SRSs.

11. The method of claim 10, further comprising detecting, by the first wireless communication device, a second set of SRSs from the second network operating entity corresponding to one or more other spatial layers, wherein the data is further pre-coded based on the second set of SRSs.

12. The method of claim 11, further comprising:
obtaining, by the first wireless communication device, spatial layer information indicating supportable spatial layers of the second network operating entity, wherein the supportable spatial layers of the second network operating entity include the one or more spatial layers and the one or more other spatial layers;
detecting, by the first wireless communication device, another reservation for the TXOP from the second network operating entity reserving the one or more other spatial layers; and
determining, by the first wireless communication device, the one or more spatial layers for communication with the second wireless communication device in the TXOP based on at least the another reservation and the spatial layer information.

13. The method of claim 12, wherein the detecting the another reservation includes receiving one or more reservation response (RRS) signals indicating the one or more other spatial layers.

14. The method of claim 12, wherein the detecting the another reservation includes the receiving the second set of SRSs.

15. The method of claim 12, wherein the detecting the another reservation includes:
   receiving a reservation request (RRQ) signal; and
   determining, by applying blind decoding on the RRQ signal over one or more search spaces, that the one or more other spatial layers are reserved for at least one of a first scheduling period within the TXOP or a transmission link direction.

16. The method of claim 12, wherein the detecting the another reservation includes:
   receiving a reservation response (RRS) signal; and
   determining, by demodulating the RRS signal, that the one or more other spatial layers are reserved for at least one of a first scheduling period within the TXOP or a transmission link direction.

17. The method of claim 12, further comprising determining, by the first wireless communication device, that sharing of unreserved supportable spatial layers is allowed based on the another reservation.

18. The method of claim 12, further comprising determining, by the first wireless communication device, that the one or more other spatial layers are reserved for a first scheduling period within the TXOP based on the another reservation, wherein the communicating the data includes communicating the data in the first scheduling period.

19. The method of claim 12, further comprising determining, by the first wireless communication device, that the one or more other spatial layers are reserved for a transmission link direction based on the another reservation, wherein the communicating the data further includes communicating the data in the transmission link direction.

20. An apparatus comprising:
   a transceiver configured to:
      communicate, with a second wireless communication device, a communication indicating a reservation for one or more spatial layers in a transmission opportunity (TXOP) of a shared spectrum, wherein the shared spectrum is shared by a first network operating entity and a second network operating entity, and wherein the apparatus and the second wireless communication device are associated with the first network operating entity, wherein the first network operating entity includes a number of supportable spatial layers including the one or more spatial layers, and wherein the reservation further indicates whether sharing of remaining unreserved supportable spatial layers is allowed; and
      communicate, with the second wireless communication device, data over the one or more spatial layers during the TXOP.

21. The apparatus of claim 20, wherein the transceiver is further configured to communicate the communication by communicating, with the second wireless communication device, one or more reservation response (RRS) signals using one or more resources designated to the apparatus or the second wireless communication device, and wherein each of the one or more resources corresponds to one of the one or more spatial layers.

22. The apparatus of claim 20, wherein the transceiver is further configured to communicate the communication by communicating, with the second wireless communication device, one or more reservation response (RRS) signals to indicate the one or more spatial layers reserved in the TXOP using a same resource as an RRS signal transmission of another wireless communication device associated with the first network operating entity.

23. The apparatus of claim 20, wherein the transceiver is further configured to communicate the communication by communicating, with the second wireless communication device, one or more sounding reference signals (SRSs) using one or more resources designated to the apparatus or the second wireless communication device, wherein each of the one or more resources corresponds to one of the one or more spatial layers, and wherein each of the one or more SRSs provides spatial channel information for a corresponding spatial layer of the one or more spatial layers.

24. The apparatus of claim 20, wherein the transceiver is further configured to:
   communicate the communication by communicating, with the second wireless communication device, a reservation request (RRQ) signal indicating a first schedule for communicating the data with the second wireless communication device over the one or more spatial layers during the TXOP; and
   communicate, with the second wireless communication device in response to the RRQ signal, a reservation response (RRS) signal.

25. The apparatus of claim 24, wherein the RRQ signal further indicates a second schedule in the TXOP for another wireless communication device associated with the first network operating entity, and wherein the RRS signal includes the first schedule and the second schedule.

26. The apparatus of claim 20, wherein the transceiver is further configured to communicate the communication by transmitting a reservation request (RRQ) signal indicating a first schedule for communicating the data with the second wireless communication device over the one or more spatial layers during the TXOP.

27. The apparatus of claim 26, further comprising a processor configured to generate the RRQ signal by:
   encoding the first schedule based on a first search space; and
   encoding a second schedule in the TXOP based on a second search space different from the first search space.

28. The apparatus of claim 20, wherein the reservation further indicates a transmission link direction, and wherein the transceiver is further configured to communicate the data by communicating the data in the transmission link direction.

29. The apparatus of claim 20, wherein the transceiver is further configured to receive, from the second wireless communication device, a first set of sounding reference signals (SRSs) corresponding to the one or more spatial layers, and wherein the data is pre-coded based on at least the first set of SRSs.

30. The apparatus of claim 29, further comprising a processor configured to detect a second set of SRSs from the second network operating entity corresponding to one or more other spatial layers, wherein the data is further pre-coded based on the second set of SRSs.

31. The apparatus of claim 30, further comprising a processor configured to:
   obtain spatial layer information indicating supportable spatial layers of the second network operating entity, wherein the supportable spatial layers of the second network operating entity include the one or more spatial layers and the one or more other spatial layers;
   detect another reservation for the TXOP from the second network operating entity reserving the one or more other spatial layers; and
   determine the one or more spatial layers for communication with the second wireless communication device in the TXOP based on at least the another reservation and the spatial layer information.

32. The apparatus of claim 31, wherein the processor is further configured to detect the another reservation by receiving one or more reservation response (RRS) signals indicating the one or more other spatial layers.

33. The apparatus of claim 31, wherein the processor is further configured to detect the another reservation by receiving the second set of SRSs.

34. The apparatus of claim 31, wherein the processor is further configured to detect the another reservation by:
receiving a reservation request (RRQ) signal; and
determining, by applying blind decoding on the RRQ signal over one or more search spaces, that the one or more other spatial layers are reserved for at least one of a first scheduling period within the TXOP or a transmission link direction.

35. The apparatus of claim 31, wherein the processor is further configured to detect the another reservation by:
receiving a reservation response (RRS) signal; and
determining, by demodulating the RRS signal, that the one or more other spatial layers are reserved for at least one of a first scheduling period within the TXOP or a transmission link direction.

36. The apparatus of claim 31, wherein the processor is further configured to determine that sharing of unreserved supportable spatial layers is allowed based on the another reservation.

37. The apparatus of claim 31, wherein the processor is further configured to determine that the one or more other spatial layers are reserved for a first scheduling period within the TXOP based on the another reservation, and wherein the communicating the data includes communicating the data in the first scheduling period.

38. The apparatus of claim 31, wherein the processor is further configured to determine that the one or more other spatial layers are reserved for a transmission link direction based on the another reservation, and wherein the transceiver is further configured to communicate the data in the transmission link direction.

39. A non-transitory computer-readable medium having program code recorded thereon, the program code comprising:
code for causing a first wireless communication device to communicate, with a second wireless communication device, a communication indicating a reservation for one or more spatial layers in a transmission opportunity (TXOP) of a shared spectrum, wherein the shared spectrum is shared by a first network operating entity and a second network operating entity, wherein the first wireless communication device and the second wireless communication device are associated with the first network operating entity, wherein the first network operating entity includes a number of supportable spatial layers including the one or more spatial layers, and wherein the reservation further indicates whether sharing of remaining unreserved supportable spatial layers is allowed; and
code for causing the first wireless communication device to communicate, with the second wireless communication device, data over the one or more spatial layers during the TXOP.

40. The non-transitory computer-readable medium of claim 39, wherein the code for causing the first wireless communication device to communicate the communication is further configured to communicate, with the second wireless communication device, one or more reservation response (RRS) signals using one or more resources designated to the first wireless communication device or the second wireless communication device, and wherein each of the one or more resources corresponds to one of the one or more spatial layers.

41. The non-transitory computer-readable medium of claim 39, wherein the code for causing the first wireless communication device to communicate the communication is further configured to communicate, with the second wireless communication device, one or more reservation response (RRS) signals to indicate the one or more spatial layers reserved in the TXOP using a same resource as an RRS signal transmission of another wireless communication device associated with the first network operating entity.

42. The non-transitory computer-readable medium of claim 39, wherein the code for causing the first wireless communication device to communicate the communication is further configured to communicate, with the second wireless communication device, one or more sounding reference signals (SRSs) using one or more resources designated to the first wireless communication device or the second wireless communication device, wherein each of the one or more resources corresponds to one of the one or more spatial layers, and wherein each of the one or more SRSs provides spatial channel information for a corresponding spatial layer of the one or more spatial layers.

43. The non-transitory computer-readable medium of claim 39, wherein the code for causing the first wireless communication device to communicate the communication is further configured to communicate, with the second wireless communication device, a reservation request (RRQ) signal indicating a first schedule for communicating the data with the second wireless communication device over the one or more spatial layers during the TXOP, wherein the non-transitory computer-readable medium further comprises code for causing the first wireless communication device to communicate, with the second wireless communication device in response to the RRQ signal, a reservation response (RRS) signal.

44. The non-transitory computer-readable medium of claim 43, wherein the RRQ signal further indicates a second schedule in the TXOP for another wireless communication device associated with the first network operating entity, and wherein the RRS signal includes the first schedule and the second schedule.

45. The non-transitory computer-readable medium of claim 39, wherein the code for causing the first wireless communication device to communicate the communication is further configured to transmit a reservation request (RRQ) signal indicating a first schedule for communication with the second wireless communication device over the one or more spatial layers during the TXOP.

46. The non-transitory computer-readable medium of claim 45, further comprising code for causing the first wireless communication device to generate the RRQ signal by:
encoding the first schedule based on a first search space; and
encoding a second schedule in the TXOP based on a second search space different from the first search space.

47. The non-transitory computer-readable medium of claim 39, wherein the reservation further indicates a transmission link direction, and wherein the code for causing the first wireless communication device to communicate the data is further configured to communicate the data in the transmission link direction.

48. The non-transitory computer-readable medium of claim 39, further comprises code for causing the first wireless communication device to receive, from the second wireless communication device, a first set of sounding reference signals (SRSs) corresponding to the one or more spatial layers, wherein the data is pre-coded based on at least the first set of SRSs.

49. The non-transitory computer-readable medium of claim 48, further comprising code for causing the first wireless communication device to detect a second set of SRSs from the second network operating entity corresponding to one or more other spatial layers, wherein the data is further pre-coded based on the second set of SRSs.

50. The non-transitory computer-readable medium of claim 49, further comprising:
code for causing the first wireless communication device to obtain spatial layer information indicating supportable spatial layers of the second network operating entity, wherein the supportable spatial layers of the second network operating entity include the one or more spatial layers and the one or more other spatial layers;
code for causing the first wireless communication device to detect another reservation for the TXOP from the second network operating entity reserving the one or more other spatial layers; and
code for causing the first wireless communication device to determine the one or more spatial layers for communication with the second wireless communication device in the TXOP based on at least the another reservation and the spatial layer information.

51. The non-transitory computer-readable medium of claim 50, wherein the code for causing the first wireless communication device to detect the another reservation is further configured to receive one or more reservation response (RRS) signals indicating the one or more other spatial layers.

52. The non-transitory computer-readable medium of claim 50, wherein the code for causing the first wireless communication device to detect the another reservation is further configured to receive the second set of SRSs.

53. The non-transitory computer-readable medium of claim 50, wherein the code for causing the first wireless communication device to detect the another reservation is further configured to:
receive a reservation request (RRQ) signal; and
determine, by applying blind decoding on the RRQ signal over one or more search spaces, that the one or more other spatial layers are reserved for at least one of a first scheduling period within the TXOP or a transmission link direction.

54. The non-transitory computer-readable medium of claim 50, wherein the code for causing the first wireless communication device to detect the another reservation is further configured to:
receive a reservation response (RRS) signal; and
determine, by demodulating the RRS signal, that the one or more other spatial layers are reserved for at least one of a first scheduling period within the TXOP or a transmission link direction.

55. The non-transitory computer-readable medium of claim 50, further comprising code for causing the first wireless communication device to determine that sharing of unreserved supportable spatial layers is allowed based on the another reservation.

56. The non-transitory computer-readable medium of claim 50, further comprising code for causing the first wireless communication device to determine that the one or more other spatial layers are reserved for a first scheduling period within the TXOP based on the another reservation, wherein the code for causing the first wireless communication device to communicate the data is further configured to communicate the data in the first scheduling period.

57. The non-transitory computer-readable medium of claim 50, further comprising code for causing the first wireless communication device to determine that the one or more other spatial layers are reserved for a transmission link direction based on the another reservation, wherein the code for causing the first wireless communication device to communicate the data is further configured to communicate the data in the transmission link direction.

* * * * *